(12) United States Patent
Johnson et al.

(10) Patent No.: US 9,764,288 B2
(45) Date of Patent: Sep. 19, 2017

(54) MEMBRANE MODULE PROTECTION

(71) Applicant: Siemens Industry, Inc., Alpharetta, GA (US)

(72) Inventors: Warren T. Johnson, Grose Wold (AU); Thomas W. Beck, North Richmond (AU); Fufang Zha, West Ryde (AU); Zhiyi Cao, Lidcombe (AU); Jessica Stiller, Riverstone (AU); Bruce Biltoft, Chatswood (AU)

(73) Assignee: Evoqua Water Technologies LLC, Pittsburgh, PA (US)

( * ) Notice: Subject to any disclaimer, the term of this patent is extended or adjusted under 35 U.S.C. 154(b) by 701 days.

(21) Appl. No.: 13/834,568

(22) Filed: Mar. 15, 2013

(65) Prior Publication Data

US 2013/0264251 A1 Oct. 10, 2013

Related U.S. Application Data

(63) Continuation-in-part of application No. 12/594,376, filed as application No. PCT/AU2008/000491 on Apr. 4, 2008, now abandoned.

(30) Foreign Application Priority Data

Apr. 4, 2007 (AU) ................................ 2007901821

(51) Int. Cl.
*B01D 63/02* (2006.01)
(52) U.S. Cl.
CPC .......... *B01D 63/02* (2013.01); *B01D 2313/06* (2013.01); *B01D 2313/23* (2013.01); *B01D 2313/26* (2013.01); *Y10T 29/49826* (2015.01)

(58) Field of Classification Search
CPC ........ B01D 71/36; B01D 63/02; B01D 63/04; B01D 65/08; B01D 65/02; B01D 69/10;
(Continued)

(56) References Cited

U.S. PATENT DOCUMENTS

| 256,008 A | 4/1882 | Leak |
| 285,321 A | 9/1883 | Tams |

(Continued)

FOREIGN PATENT DOCUMENTS

| AU | 34400/84 A | 4/1985 |
| AU | 55847/86 A | 9/1986 |

(Continued)

OTHER PUBLICATIONS

"Chemical Cleaning Definition", Lenntech BV, Lenntech Water Treatment & Purification Holding B.V., Chemical Cleaning.
(Continued)

*Primary Examiner* — David C Mellon

(57) ABSTRACT

In accordance with aspects and embodiments, a filtration system is provided comprising a membrane module comprising an upper header and a lower header, a plurality of hollow fiber membranes having an upper end potted in the upper header and a lower end potted in the lower head, a cage at least partially surrounding the plurality of hollow fiber membranes, and a screen in contact with and surrounding the cage, the filtration system further comprising an aeration cap coupled to the lower header of the membrane module. The screen may protect the hollow fiber membranes from damage from coarse contaminants contained in the feed liquid, may improve module integrity, and may improve the efficiency of the filtration system.

19 Claims, 23 Drawing Sheets

(58) Field of Classification Search
CPC ...... B01D 69/12; B01D 69/08; B01D 69/081;
B01D 2315/06; B01D 2321/18; B01D
2321/185; B01D 2325/02; B01D 2325/24;
B01D 2325/34; B01D 2313/23; B01D
2313/06; B01D 2313/26; Y10T 29/49826
See application file for complete search history.

(56) References Cited

U.S. PATENT DOCUMENTS

| | | |
|---|---|---|
| 403,507 A | 5/1889 | Bode |
| 511,995 A | 1/1894 | Buckley |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,246,761 A | 4/1966 | Bryan et al. |
| 3,275,554 A | 9/1966 | Wagenaar |
| 3,421,354 A | 1/1969 | Strybel et al. |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Shorr |
| 3,563,860 A | 2/1971 | Henderyckx |
| 3,591,010 A | 7/1971 | Pall et al. |
| 3,592,450 A | 7/1971 | Rippon |
| 3,625,827 A | 12/1971 | Wildi et al. |
| 3,628,775 A | 12/1971 | McConnell et al. |
| 3,654,147 A | 4/1972 | Levin |
| 3,679,052 A | 7/1972 | Asper |
| 3,689,009 A | 9/1972 | Terrell |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,827,566 A * | 8/1974 | Ponce ................ B01D 29/0022 210/338 |
| 3,843,809 A | 10/1974 | Luck |
| 3,876,738 A | 4/1975 | Marinaccio et al. |
| 3,912,624 A | 10/1975 | Jennings |
| 3,937,015 A | 2/1976 | Akado et al. |
| 3,955,998 A | 5/1976 | Clampitt et al. |
| 3,962,095 A | 6/1976 | Luppi |
| 3,968,192 A | 7/1976 | Hoffman, III et al. |
| 3,982,095 A | 9/1976 | Robinson |
| 3,992,301 A | 11/1976 | Shippey et al. |
| 3,993,816 A | 11/1976 | Baudet et al. |
| 4,016,078 A | 4/1977 | Clark |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,130,622 A | 12/1978 | Pawlak |
| 4,138,460 A | 2/1979 | Tigner |
| 4,157,899 A | 6/1979 | Wheaton |
| 4,169,873 A | 10/1979 | Lipert |
| 4,183,890 A | 1/1980 | Bollinger |
| 4,187,263 A | 2/1980 | Lipert |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,371,427 A | 2/1983 | Holler et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,830 A | 10/1987 | Makino et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |

(56) References Cited

U.S. PATENT DOCUMENTS

| | | |
|---|---|---|
| 4,749,487 A | 6/1988 | Lefebvre |
| 4,752,421 A | 6/1988 | Makino |
| 4,756,875 A | 7/1988 | Tajima et al. |
| 4,763,612 A | 8/1988 | Iwanami |
| 4,767,539 A | 8/1988 | Ford |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,828,696 A | 5/1989 | Makino et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,889,620 A | 12/1989 | Schmit et al. |
| 4,904,426 A | 2/1990 | Lundgard et al. |
| 4,908,114 A | 3/1990 | Ayers |
| 4,911,838 A | 3/1990 | Tanaka |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,969,997 A | 11/1990 | Kluver et al. |
| 4,980,066 A | 12/1990 | Slegers |
| 4,988,444 A | 1/1991 | Applegate et al. |
| 4,990,251 A | 2/1991 | Spranger et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,069,353 A | 12/1991 | Espenan |
| 5,075,044 A | 12/1991 | Augem |
| 5,075,065 A | 12/1991 | Effenberger et al. |
| 5,076,925 A | 12/1991 | Roesink et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A | 4/1992 | Cote et al. |
| 5,104,546 A | 4/1992 | Filson et al. |
| H001045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,244,579 A | 9/1993 | Horner et al. |
| 5,248,424 A | 9/1993 | Cote et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,345 A | 3/1995 | Park |
| 5,401,401 A | 3/1995 | Hickok et al. |
| 5,401,405 A | 3/1995 | McDougald |
| 5,403,479 A | 4/1995 | Smith et al. |
| 5,405,528 A | 4/1995 | Selbie et al. |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,482,625 A | 1/1996 | Shimizu et al. |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A | 3/1997 | Cote et al. |
| 5,626,755 A | 5/1997 | Keyser et al. |
| 5,629,084 A | 5/1997 | Moya |
| 5,633,163 A | 5/1997 | Cameron |
| 5,639,373 A | 6/1997 | Mahendran et al. |
| 5,643,455 A | 7/1997 | Kopp et al. |

(56) References Cited

U.S. PATENT DOCUMENTS

| | | |
|---|---|---|
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| 5,786,528 A | 7/1998 | Dileo et al. |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,024,872 A | 2/2000 | Mahendran et al. |
| 6,036,030 A | 3/2000 | Stone et al. |
| 6,039,872 A | 3/2000 | Wu et al. |
| 6,042,677 A | 3/2000 | Mahendran et al. |
| 6,045,698 A | 4/2000 | Cote et al. |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,071,404 A | 6/2000 | Tsui |
| 6,074,718 A | 6/2000 | Puglia et al. |
| 6,077,435 A | 6/2000 | Beck et al. |
| 6,083,381 A | 7/2000 | Connelly et al. |
| 6,083,393 A | 7/2000 | Wu et al. |
| 6,096,213 A | 8/2000 | Radovanovic et al. |
| 6,113,782 A | 9/2000 | Leonard |
| 6,120,688 A | 9/2000 | Daly et al. |
| 6,126,819 A | 10/2000 | Heine et al. |
| 6,146,747 A | 11/2000 | Wang et al. |
| 6,149,817 A | 11/2000 | Peterson et al. |
| 6,156,200 A | 12/2000 | Zha et al. |
| 6,159,373 A | 12/2000 | Beck et al. |
| 6,162,020 A | 12/2000 | Kondo |
| 6,171,496 B1 * | 1/2001 | Patil .................. A01N 25/10 210/321.88 |
| 6,193,890 B1 | 2/2001 | Pedersen et al. |
| 6,202,475 B1 | 3/2001 | Selbie et al. |
| 6,214,231 B1 | 4/2001 | Cote et al. |
| 6,214,232 B1 | 4/2001 | Baurmeister et al. |
| 6,217,770 B1 | 4/2001 | Haney et al. |
| 6,221,247 B1 | 4/2001 | Nemser et al. |
| 6,224,767 B1 | 5/2001 | Fujiwara et al. |
| 6,245,239 B1 | 6/2001 | Cote et al. |
| 6,254,773 B1 | 7/2001 | Biltoft |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,290,756 B1 | 9/2001 | Macheras et al. |
| 6,294,039 B1 | 9/2001 | Mahendran et al. |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,319,411 B1 | 11/2001 | Cote |
| 6,322,703 B1 | 11/2001 | Taniguchi et al. |
| 6,324,898 B1 | 12/2001 | Cote et al. |
| 6,325,928 B1 | 12/2001 | Pedersen et al. |
| 6,325,938 B1 | 12/2001 | Miyashita et al. |
| 6,331,248 B1 | 12/2001 | Taniguchi et al. |
| 6,337,018 B1 | 1/2002 | Mickols |
| RE37,549 E | 2/2002 | Mahendran et al. |
| 6,349,835 B1 | 2/2002 | Saux et al. |
| 6,354,444 B1 | 3/2002 | Mahendran et al. |
| 6,361,695 B1 | 3/2002 | Husain et al. |
| 6,368,819 B1 | 4/2002 | Gaddy et al. |
| 6,372,138 B1 | 4/2002 | Cho et al. |
| 6,375,848 B1 | 4/2002 | Cote et al. |
| 6,383,369 B2 | 5/2002 | Elston |
| 6,387,189 B1 | 5/2002 | Groschl et al. |
| 6,402,955 B2 | 6/2002 | Ookata |
| 6,406,629 B1 | 6/2002 | Husain et al. |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,468,430 B1 | 10/2002 | Kimura et al. |
| 6,471,869 B1 | 10/2002 | Yanou et al. |
| 6,485,645 B1 | 11/2002 | Husain et al. |
| 6,495,041 B2 | 12/2002 | Taniguchi et al. |
| 6,517,723 B1 | 2/2003 | Daigger et al. |
| 6,524,481 B2 | 2/2003 | Zha et al. |
| 6,524,733 B1 | 2/2003 | Nonobe |
| 6,550,747 B2 | 4/2003 | Rabie et al. |
| 6,555,005 B1 | 4/2003 | Zha et al. |
| 6,562,237 B1 | 5/2003 | Olaopa |
| 6,576,136 B1 | 6/2003 | De Moel et al. |
| 6,592,762 B2 | 7/2003 | Smith |
| D478,913 S | 8/2003 | Johnson et al. |
| 6,613,222 B2 | 9/2003 | Mikkelson et al. |
| 6,620,319 B2 | 9/2003 | Behmann et al. |
| 6,623,643 B2 | 9/2003 | Chisholm et al. |
| 6,627,082 B2 | 9/2003 | Del Vecchio et al. |
| 6,632,358 B1 | 10/2003 | Suga et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,185 B2 | 3/2004 | Goel et al. |
| 6,706,189 B2 | 3/2004 | Rabie et al. |
| 6,708,957 B2 | 3/2004 | Cote et al. |
| 6,712,970 B1 | 3/2004 | Trivedi |
| 6,721,529 B2 | 4/2004 | Chen et al. |
| 6,723,242 B1 | 4/2004 | Ohkata et al. |
| 6,723,758 B2 | 4/2004 | Stone et al. |
| 6,727,305 B1 | 4/2004 | Aranguiz |
| 6,743,362 B1 | 6/2004 | Porteous et al. |
| 6,755,894 B2 | 6/2004 | Bikson et al. |
| 6,755,970 B1 | 6/2004 | Knappe et al. |
| 6,758,972 B2 | 7/2004 | Vriens et al. |
| 6,761,826 B2 | 7/2004 | Bender |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,347 B2 | 9/2004 | Jeong et al. |
| 6,790,912 B2 | 9/2004 | Blong |
| 6,805,806 B2 | 10/2004 | Arnaud |
| 6,808,629 B2 | 10/2004 | Wouters-Wasiak et al. |
| 6,811,696 B2 | 11/2004 | Wang et al. |

(56) References Cited

U.S. PATENT DOCUMENTS

| | | |
|---|---|---|
| 6,814,861 B2 | 11/2004 | Husain et al. |
| 6,821,420 B2 | 11/2004 | Zha et al. |
| 6,830,782 B2 | 12/2004 | Kanazawa |
| 6,840,251 B2 | 1/2005 | Gill et al. |
| 6,841,070 B2 | 1/2005 | Zha et al. |
| 6,861,466 B2 | 3/2005 | Dadalas et al. |
| 6,863,816 B2 | 3/2005 | Austin et al. |
| 6,863,817 B2 | 3/2005 | Liu et al. |
| 6,863,818 B2 | 3/2005 | Daigger et al. |
| 6,863,823 B2 | 3/2005 | Cote |
| 6,869,534 B2 | 3/2005 | McDowell et al. |
| 6,872,305 B2 | 3/2005 | Johnson et al. |
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,936,085 B2 | 8/2005 | DeMarco |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,964,741 B2 | 11/2005 | Mahendran et al. |
| 6,969,465 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowell |
| 7,014,763 B2 | 3/2006 | Johnson et al. |
| 7,018,530 B2 | 3/2006 | Pollock |
| 7,018,533 B2 | 3/2006 | Johnson et al. |
| 7,022,233 B2 | 4/2006 | Chen |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,087,173 B2 | 8/2006 | Cote et al. |
| 7,122,121 B1 | 10/2006 | Ji |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,160,464 B2 | 1/2007 | Lee et al. |
| 7,172,699 B1 | 2/2007 | Trivedi et al. |
| 7,172,701 B2 | 2/2007 | Gaid et al. |
| 7,186,344 B2 | 3/2007 | Hughes |
| 7,208,091 B2 | 4/2007 | Pind et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,255,788 B2 | 8/2007 | Okazaki et al. |
| 7,264,716 B2 | 9/2007 | Johnson et al. |
| 7,279,100 B2 | 10/2007 | Devine |
| 7,279,215 B2 | 10/2007 | Hester et al. |
| 7,300,022 B2 | 11/2007 | Muller |
| 7,314,563 B2 | 1/2008 | Cho et al. |
| 7,329,344 B2 | 2/2008 | Jordan et al. |
| 7,344,645 B2 | 3/2008 | Beck et al. |
| 7,361,274 B2 | 4/2008 | Lazaredes |
| 7,378,024 B2 | 5/2008 | Bartels et al. |
| 7,387,723 B2 | 6/2008 | Jordan |
| 7,404,896 B2 | 7/2008 | Muller |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |
| 7,510,655 B2 | 3/2009 | Barnes |
| 7,531,042 B2 | 5/2009 | Murkute et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 8,197,688 B2 | 6/2012 | Sakashita et al. |
| 8,679,337 B2 | 3/2014 | Ishibashi et al. |
| 2001/0035092 A1* | 11/2001 | Hachimaki ............ B01D 53/22 96/6 |
| 2001/0047962 A1 | 12/2001 | Zha et al. |
| 2001/0052494 A1 | 12/2001 | Cote et al. |
| 2002/0027111 A1 | 3/2002 | Ando et al. |
| 2002/0070157 A1 | 6/2002 | Yamada |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2002/0189999 A1 | 12/2002 | Espenan et al. |
| 2002/0195390 A1 | 12/2002 | Zha et al. |
| 2003/0034286 A1* | 2/2003 | Butler .................. B01D 24/008 210/163 |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0062301 A1 | 4/2003 | Merrie et al. |
| 2003/0075495 A1 | 4/2003 | Dannstrom et al. |
| 2003/0075504 A1 | 4/2003 | Zha et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159977 A1 | 8/2003 | Tanny et al. |
| 2003/0159988 A1 | 8/2003 | Daigger et al. |
| 2003/0178365 A1 | 9/2003 | Zha et al. |
| 2003/0196955 A1 | 10/2003 | Hughes |
| 2003/0226797 A1 | 12/2003 | Phelps |
| 2003/0234221 A1 | 12/2003 | Johnson et al. |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0035779 A1 | 2/2004 | Vossenkaul et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. |
| 2004/0118779 A1 | 6/2004 | Rawson et al. |
| 2004/0129637 A1 | 7/2004 | Husain et al. |
| 2004/0139992 A1 | 7/2004 | Murkute et al. |
| 2004/0145076 A1 | 7/2004 | Zha et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178136 A1 | 9/2004 | Taniguchi et al. |
| 2004/0178154 A1 | 9/2004 | Zha et al. |
| 2004/0188339 A1 | 9/2004 | Murkute et al. |
| 2004/0188341 A1 | 9/2004 | Zha et al. |
| 2004/0211726 A1 | 10/2004 | Baig et al. |
| 2004/0217053 A1 | 11/2004 | Zha et al. |
| 2004/0222158 A1 | 11/2004 | Husain et al. |
| 2004/0232076 A1 | 11/2004 | Zha et al. |
| 2004/0238442 A1 | 12/2004 | Johnson et al. |
| 2004/0245174 A1 | 12/2004 | Takayama et al. |
| 2005/0000885 A1 | 1/2005 | Stockbower |
| 2005/0006308 A1 | 1/2005 | Cote et al. |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |

(56) References Cited

U.S. PATENT DOCUMENTS

| | | |
|---|---|---|
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0092674 A1 | 5/2005 | Mahendran et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0161389 A1 | 7/2005 | Takeda et al. |
| 2005/0184008 A1 | 8/2005 | Schacht et al. |
| 2005/0194305 A1 | 9/2005 | Vido et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |
| 2006/0000775 A1 | 1/2006 | Zha et al. |
| 2006/0021929 A1 | 2/2006 | Mannheim et al. |
| 2006/0033222 A1* | 2/2006 | Godfrey ............. B01F 3/04262 261/122.1 |
| 2006/0065596 A1 | 3/2006 | Kent et al. |
| 2006/0081533 A1 | 4/2006 | Khudenko |
| 2006/0091074 A1 | 5/2006 | Pedersen et al. |
| 2006/0131234 A1 | 6/2006 | Zha et al. |
| 2006/0145366 A1 | 7/2006 | Thomas |
| 2006/0151373 A1 | 7/2006 | Szabo et al. |
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1 | 11/2006 | Zha et al. |
| 2006/0273007 A1 | 12/2006 | Zha et al. |
| 2006/0273038 A1 | 12/2006 | Syed et al. |
| 2007/0007205 A1 | 1/2007 | Johnson et al. |
| 2007/0007207 A1 | 1/2007 | Mahendran et al. |
| 2007/0007214 A1 | 1/2007 | Zha et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0095741 A1 | 5/2007 | Berends |
| 2007/0102339 A1 | 5/2007 | Cote et al. |
| 2007/0108125 A1 | 5/2007 | Cho et al. |
| 2007/0131614 A1 | 6/2007 | Knappe et al. |
| 2007/0138090 A1 | 6/2007 | Jordan et al. |
| 2007/0163942 A1* | 7/2007 | Tanaka ............. B01D 63/02 210/321.89 |
| 2007/0170112 A1 | 7/2007 | Elefritz et al. |
| 2007/0181496 A1 | 8/2007 | Zuback |
| 2007/0227973 A1 | 10/2007 | Zha et al. |
| 2008/0053923 A1 | 3/2008 | Beck et al. |
| 2008/0093297 A1 | 4/2008 | Gock et al. |
| 2008/0156745 A1 | 7/2008 | Zha et al. |
| 2008/0179249 A1 | 7/2008 | Beck et al. |
| 2008/0190846 A1 | 8/2008 | Cox et al. |
| 2008/0203016 A1 | 8/2008 | Johnson et al. |
| 2008/0203017 A1 | 8/2008 | Zha et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0223895 A1 | 9/2009 | Zha et al. |
| 2009/0255873 A1 | 10/2009 | Biltoft et al. |
| 2010/0000941 A1 | 1/2010 | Muller |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0023913 A1 | 2/2011 | Fulling |
| 2011/0049047 A1 | 3/2011 | Cumin et al. |
| 2011/0049048 A1 | 3/2011 | Benner et al. |
| 2011/0056522 A1 | 3/2011 | Zauner et al. |
| 2011/0100907 A1 | 5/2011 | Zha et al. |
| 2011/0114557 A2 | 5/2011 | Johnson et al. |
| 2011/0127209 A1 | 6/2011 | Rogers et al. |
| 2011/0132826 A1 | 6/2011 | Muller et al. |
| 2011/0139715 A1 | 6/2011 | Zha et al. |
| 2011/0147298 A1 | 6/2011 | Kennedy et al. |
| 2011/0192783 A1 | 8/2011 | Cox et al. |
| 2011/0198283 A1 | 8/2011 | Zha et al. |
| 2012/0074053 A1 | 3/2012 | Collignon et al. |
| 2012/0091602 A1 | 4/2012 | Cumin et al. |
| 2012/0097601 A1 | 4/2012 | Lee et al. |
| 2012/0103904 A1* | 5/2012 | Morita ............. B01D 61/147 210/650 |
| 2012/0187044 A1 | 7/2012 | Zha et al. |
| 2012/0285885 A1 | 11/2012 | James et al. |
| 2013/0037467 A1 | 2/2013 | Biltoft et al. |
| 2013/0056426 A1 | 3/2013 | Barnes |
| 2013/0153496 A1 | 6/2013 | Zha et al. |
| 2013/0168307 A1 | 7/2013 | Drivarbekk et al. |
| 2014/0174998 A1 | 6/2014 | Aerts et al. |
| 2015/0136686 A1 | 5/2015 | Chen |

FOREIGN PATENT DOCUMENTS

| | | |
|---|---|---|
| AU | 77066/87 A | 2/1988 |
| AU | 762091 B2 | 6/2003 |
| AU | 2004289373 A1 | 5/2005 |
| CA | 2460207 A1 | 3/2003 |
| CA | 2531764 A1 | 3/2005 |
| CN | 86104888 A | 2/1988 |
| CN | 1050770 | 1/1995 |
| CN | 2204898 Y | 8/1995 |
| CN | 2236049 Y | 9/1996 |
| CN | 1159769 A | 9/1997 |
| CN | 1244814 A | 2/2000 |
| CN | 1249698 A | 4/2000 |
| CN | 1265636 A | 9/2000 |
| CN | 1319032 A | 10/2001 |
| CN | 1468140 A | 1/2004 |
| CN | 1541757 A | 11/2004 |
| CN | 1735452 A | 2/2006 |
| CN | 101039739 A | 9/2007 |
| CN | 101052457 A | 10/2007 |
| CN | 101287538 A | 10/2008 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 4326603 A1 | 2/1995 |
| DE | 19503060 A1 | 8/1996 |
| DE | 19718028 C1 | 6/1998 |
| DE | 29804927 U1 | 6/1998 |
| DE | 29906389 U1 | 6/1999 |
| DE | 10045227 C1 | 2/2002 |
| DE | 10209170 C1 | 8/2003 |
| DE | 202004012693 U1 | 10/2004 |
| EP | 0038612 B1 | 10/1981 |
| EP | 012557 B1 | 2/1983 |
| EP | 0090383 A2 | 10/1983 |
| EP | 126714 A2 | 11/1984 |
| EP | 050447 B1 | 10/1985 |
| EP | 194735 A2 | 9/1986 |
| EP | 250337 A1 | 12/1987 |
| EP | 327025 A1 | 8/1989 |
| EP | 344633 A1 | 12/1989 |
| EP | 090383 B1 | 5/1990 |
| EP | 407900 A2 | 1/1991 |
| EP | 463627 A2 | 1/1992 |
| EP | 0464321 A1 | 1/1992 |
| EP | 492942 A2 | 7/1992 |
| EP | 518250 B1 | 12/1992 |
| EP | 547575 A1 | 6/1993 |

(56) References Cited

FOREIGN PATENT DOCUMENTS

| | | |
|---|---|---|
| EP | 280052 B1 | 7/1994 |
| EP | 395133 B1 | 2/1995 |
| EP | 662341 A1 | 7/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 848194 A2 | 6/1998 |
| EP | 855214 A1 | 7/1998 |
| EP | 627255 B1 | 1/1999 |
| EP | 911073 A1 | 4/1999 |
| EP | 920904 A2 | 6/1999 |
| EP | 0937494 A2 | 8/1999 |
| EP | 1034835 A1 | 9/2000 |
| EP | 1052012 A1 | 11/2000 |
| EP | 1156015 A1 | 11/2001 |
| EP | 1300186 A1 | 4/2003 |
| EP | 1349644 B1 | 10/2003 |
| EP | 1350555 A1 | 10/2003 |
| EP | 1236503 B1 | 8/2004 |
| EP | 1445240 | 8/2004 |
| EP | 1466658 A1 | 10/2004 |
| EP | 1659171 A1 | 5/2006 |
| EP | 1420874 B1 | 1/2011 |
| FR | 2620712 A1 | 3/1989 |
| FR | 2674448 A1 | 10/1992 |
| FR | 2699424 A1 | 6/1994 |
| FR | 2762834 A1 | 11/1998 |
| GB | 702911 A | 1/1954 |
| GB | 996195 A | 6/1965 |
| GB | 2253572 A | 9/1992 |
| JP | 52-078677 A | 7/1977 |
| JP | 53-5077 | 1/1978 |
| JP | 53108882 A | 9/1978 |
| JP | 54162684 A | 12/1979 |
| JP | 55099703 A | 7/1980 |
| JP | 55129107 A | 10/1980 |
| JP | 55129155 A | 10/1980 |
| JP | 56021604 A | 2/1981 |
| JP | 56118701 A | 9/1981 |
| JP | 56121685 A | 9/1981 |
| JP | 57190697 A | 11/1982 |
| JP | 58088007 A | 5/1983 |
| JP | 60019002 A | 1/1985 |
| JP | 60206412 A | 10/1985 |
| JP | 60260628 A | 12/1985 |
| JP | 61097005 A | 5/1986 |
| JP | 61097006 A | 5/1986 |
| JP | 61107905 A | 5/1986 |
| JP | 61167406 A | 7/1986 |
| JP | 61167407 A | 7/1986 |
| JP | 61171504 A | 8/1986 |
| JP | 61192309 A | 8/1986 |
| JP | 61222510 A | 10/1986 |
| JP | 61242607 A | 10/1986 |
| JP | 61249505 A | 11/1986 |
| JP | 61257203 A | 11/1986 |
| JP | 61263605 A | 11/1986 |
| JP | 61291007 A | 12/1986 |
| JP | 61293504 A | 12/1986 |
| JP | 62004408 A | 1/1987 |
| JP | 62068828 A | 3/1987 |
| JP | 62114609 A | 5/1987 |
| JP | 62140607 A | 6/1987 |
| JP | 62144708 A | 6/1987 |
| JP | 62163708 A | 7/1987 |
| JP | 62179540 A | 8/1987 |
| JP | 62237908 A | 10/1987 |
| JP | 62250908 A | 10/1987 |
| JP | 62187606 | 11/1987 |
| JP | 62262710 A | 11/1987 |
| JP | 63-93307 | 4/1988 |
| JP | 63097634 A | 4/1988 |
| JP | 63099246 A | 4/1988 |
| JP | 63143905 A | 6/1988 |
| JP | 63-1602 | 7/1988 |
| JP | 63171607 A | 7/1988 |
| JP | 63180254 A | 7/1988 |
| JP | S63-38884 | 10/1988 |
| JP | 64-075542 A | 3/1989 |
| JP | 1-501046 T | 4/1989 |
| JP | 1111494 | 4/1989 |
| JP | 01151906 A | 6/1989 |
| JP | 01-307409 A | 12/1989 |
| JP | 02-017925 | 1/1990 |
| JP | 02017924 | 1/1990 |
| JP | 02026625 A | 1/1990 |
| JP | 02031200 A | 2/1990 |
| JP | 02040296 A | 2/1990 |
| JP | 02107318 A | 4/1990 |
| JP | 02126922 A | 5/1990 |
| JP | 02144132 A | 6/1990 |
| JP | 02164423 A | 6/1990 |
| JP | 02174918 A | 7/1990 |
| JP | 02241523 A | 9/1990 |
| JP | 02277528 A | 11/1990 |
| JP | 02284035 A | 11/1990 |
| JP | 03018373 A | 1/1991 |
| JP | 03028797 A | 2/1991 |
| JP | 03-086529 A | 4/1991 |
| JP | 03110445 A | 5/1991 |
| JP | 04108518 A | 4/1992 |
| JP | 04110023 A | 4/1992 |
| JP | 4-190889 A | 7/1992 |
| JP | 04187224 A | 7/1992 |
| JP | 4-256425 A | 9/1992 |
| JP | 04250898 A | 9/1992 |
| JP | 04256424 A | 9/1992 |
| JP | 04265128 A | 9/1992 |
| JP | 04293527 A | 10/1992 |
| JP | 04310223 A | 11/1992 |
| JP | 04317793 A | 11/1992 |
| JP | 04334530 A | 11/1992 |
| JP | 04348252 A | 12/1992 |
| JP | 05-4030 | 1/1993 |
| JP | 05023557 A | 2/1993 |
| JP | 05096136 A | 4/1993 |
| JP | 05137977 A | 6/1993 |
| JP | 05157654 A | 6/1993 |
| JP | 05161831 A | 6/1993 |
| JP | 05184884 A | 7/1993 |
| JP | 05279447 A | 10/1993 |
| JP | 05285348 A | 11/1993 |
| JP | 05305221 A | 11/1993 |
| JP | 06-027215 A | 2/1994 |
| JP | 06071120 A | 3/1994 |
| JP | 06114240 A | 4/1994 |
| JP | 06170364 A | 6/1994 |
| JP | 06190250 A | 7/1994 |
| JP | 06218237 A | 8/1994 |
| JP | 06238273 A | 8/1994 |
| JP | 06-292820 A | 10/1994 |
| JP | 06277469 A | 10/1994 |
| JP | 06285496 A | 10/1994 |
| JP | 06343837 A | 12/1994 |
| JP | 07000770 A | 1/1995 |
| JP | 07024272 A | 1/1995 |
| JP | 07047247 A | 2/1995 |
| JP | 07068139 A | 3/1995 |
| JP | 07136470 A | 5/1995 |
| JP | 07136471 A | 5/1995 |
| JP | 07155564 A | 6/1995 |
| JP | 07155758 A | 6/1995 |
| JP | 7-39921 | 7/1995 |
| JP | 07178323 A | 7/1995 |
| JP | 07185268 A | 7/1995 |
| JP | 07185270 A | 7/1995 |
| JP | 07185271 A | 7/1995 |
| JP | 07185272 A | 7/1995 |
| JP | 07204635 A | 8/1995 |
| JP | 07236819 A | 9/1995 |
| JP | 07251043 A | 10/1995 |
| JP | 07256253 | 10/1995 |

(56) References Cited

FOREIGN PATENT DOCUMENTS

| | | |
|---|---|---|
| JP | 07275665 A | 10/1995 |
| JP | 07289860 A | 11/1995 |
| JP | 07303895 A | 11/1995 |
| JP | 07313973 A | 12/1995 |
| JP | 08010585 A | 1/1996 |
| JP | 8039089 A | 2/1996 |
| JP | 08197053 A | 8/1996 |
| JP | 08323161 A | 12/1996 |
| JP | 08332357 A | 12/1996 |
| JP | 09000890 A | 1/1997 |
| JP | 09038470 A | 2/1997 |
| JP | 09038648 A | 2/1997 |
| JP | 09072993 A | 3/1997 |
| JP | 09075689 A | 3/1997 |
| JP | 09099227 A | 4/1997 |
| JP | 09103655 A | 4/1997 |
| JP | 09103661 A | 4/1997 |
| JP | 9117647 A | 5/1997 |
| JP | 9138298 A | 5/1997 |
| JP | 09141063 A | 6/1997 |
| JP | 09155345 A | 6/1997 |
| JP | 09187628 A | 7/1997 |
| JP | 09192458 A | 7/1997 |
| JP | 09220569 A | 8/1997 |
| JP | 09271641 A | 10/1997 |
| JP | 09313902 A | 12/1997 |
| JP | 09324067 A | 12/1997 |
| JP | 10015365 A | 1/1998 |
| JP | 10024222 A | 1/1998 |
| JP | 10033955 A | 2/1998 |
| JP | 10048466 A | 2/1998 |
| JP | 10066972 A | 3/1998 |
| JP | 10076144 A | 3/1998 |
| JP | 10076264 A | 3/1998 |
| JP | 10085562 A | 4/1998 |
| JP | 10085565 A | 4/1998 |
| JP | 10085566 A | 4/1998 |
| JP | 10156149 A | 6/1998 |
| JP | 10180048 A | 7/1998 |
| JP | 10225685 A | 8/1998 |
| JP | 10235168 A | 9/1998 |
| JP | 10249171 A | 9/1998 |
| JP | 10286441 A | 10/1998 |
| JP | 10328538 A | 12/1998 |
| JP | 11005023 A | 1/1999 |
| JP | 11028339 A | 2/1999 |
| JP | 11028467 A | 2/1999 |
| JP | 11031025 A | 2/1999 |
| JP | 11033365 A | 2/1999 |
| JP | 11033367 A | 2/1999 |
| JP | 11076769 A | 3/1999 |
| JP | 11076770 A | 3/1999 |
| JP | 11090189 A | 4/1999 |
| JP | 11156166 A | 6/1999 |
| JP | 11156360 A | 6/1999 |
| JP | 11165200 A | 6/1999 |
| JP | 11179171 A | 7/1999 |
| JP | 11300177 A | 11/1999 |
| JP | 11302438 A | 11/1999 |
| JP | 11309351 A | 11/1999 |
| JP | 11319501 A | 11/1999 |
| JP | 11319507 A | 11/1999 |
| JP | 11333265 A | 12/1999 |
| JP | 2000000439 A | 1/2000 |
| JP | 200051670 | 2/2000 |
| JP | 2000051669 A | 2/2000 |
| JP | 2000061466 A | 2/2000 |
| JP | 2000079390 A | 3/2000 |
| JP | 2000070684 A | 3/2000 |
| JP | 2000093758 | 4/2000 |
| JP | 2000157845 | 6/2000 |
| JP | 2000157850 A | 6/2000 |
| JP | 2000185220 A | 7/2000 |
| JP | 2000189958 A | 7/2000 |
| JP | 2000233020 A | 8/2000 |
| JP | 2000237548 A | 9/2000 |
| JP | 2000300968 A | 10/2000 |
| JP | 2000317276 A | 11/2000 |
| JP | 2000334276 A | 12/2000 |
| JP | 2000342932 A | 12/2000 |
| JP | 2001009246 A | 1/2001 |
| JP | 2001070967 A | 3/2001 |
| JP | 2001079366 A | 3/2001 |
| JP | 2001079367 A | 3/2001 |
| JP | 2001104760 A | 4/2001 |
| JP | 2001120963 A | 5/2001 |
| JP | 2001-510396 T | 7/2001 |
| JP | 2001179059 A | 7/2001 |
| JP | 2001179060 A | 7/2001 |
| JP | 2001190937 A | 7/2001 |
| JP | 2001190938 A | 7/2001 |
| JP | 2001205055 A | 7/2001 |
| JP | 2001212587 A | 8/2001 |
| JP | 2001232160 A | 8/2001 |
| JP | 2001-269546 | 10/2001 |
| JP | 2002011472 A | 1/2002 |
| JP | 2002143849 A | 5/2002 |
| JP | 2002177746 A | 6/2002 |
| JP | 3302992 B2 | 7/2002 |
| JP | 2002525197 T | 8/2002 |
| JP | 2002527229 A | 8/2002 |
| JP | 2002263407 A | 9/2002 |
| JP | 2002-336663 | 11/2002 |
| JP | 2003024751 | 1/2003 |
| JP | 2003047830 A | 2/2003 |
| JP | 2003053157 A | 2/2003 |
| JP | 2003053160 A | 2/2003 |
| JP | 200371254 A | 3/2003 |
| JP | 2003062436 A | 3/2003 |
| JP | 2003135935 A | 5/2003 |
| JP | 2003190976 A | 7/2003 |
| JP | 2003-265597 | 9/2003 |
| JP | 2003-275548 A | 9/2003 |
| JP | 2003266072 A | 9/2003 |
| JP | 2003275759 A | 9/2003 |
| JP | 2003340250 A | 12/2003 |
| JP | 2004008981 | 1/2004 |
| JP | 2004050011 A | 2/2004 |
| JP | 2004073950 A | 3/2004 |
| JP | 2004-230287 A | 8/2004 |
| JP | 2004216263 A | 8/2004 |
| JP | 2004230280 A | 8/2004 |
| JP | 2004249168 A | 9/2004 |
| JP | 2004322100 A | 11/2004 |
| JP | 2004-536710 A | 12/2004 |
| JP | 2004337730 A | 12/2004 |
| JP | 2005-502467 A | 1/2005 |
| JP | 2005-087887 A | 4/2005 |
| JP | 2005144291 A | 6/2005 |
| JP | 2005154551 A | 6/2005 |
| JP | 2005279447 A | 10/2005 |
| JP | 2006116495 | 5/2006 |
| JP | 2007547083 | 8/2010 |
| JP | 4833353 B2 | 12/2011 |
| KR | 20-0232145 | 7/2001 |
| KR | 1020020067227 | 8/2002 |
| KR | 20-0295350 | 11/2002 |
| KR | 2002-0090967 | 12/2002 |
| KR | 2003-033812 | 5/2003 |
| KR | 2003-060625 | 7/2003 |
| KR | 20030066271 | 8/2003 |
| KR | 20030097167 | 12/2003 |
| KR | 2005-063478 | 6/2005 |
| NL | 1006390 C2 | 12/1998 |
| NL | 1020491 C | 10/2003 |
| NL | 1021197 C | 10/2003 |
| NO | 20053769 A | 2/2006 |
| NZ | 510394 A | 5/2003 |
| NZ | 537874 A | 2/2007 |
| TW | 216773 B | 12/1993 |
| TW | 347343 | 12/1998 |
| WO | 8501449 A1 | 4/1985 |
| WO | 8605116 A1 | 9/1986 |
| WO | 8605705 A1 | 10/1986 |

(56) References Cited

FOREIGN PATENT DOCUMENTS

| | | |
|---|---|---|
| WO | 8800494 A1 | 1/1988 |
| WO | 8801529 A1 | 3/1988 |
| WO | 8801895 A1 | 3/1988 |
| WO | 8806200 A1 | 8/1988 |
| WO | 8900880 A1 | 2/1989 |
| WO | 9000434 A1 | 1/1990 |
| WO | 9104783 A1 | 4/1991 |
| WO | 9116124 A1 | 10/1991 |
| WO | 9302779 A1 | 2/1993 |
| WO | 9315827 A1 | 8/1993 |
| WO | 9323152 A1 | 11/1993 |
| WO | 9411094 A1 | 5/1994 |
| WO | 9511736 A1 | 5/1995 |
| WO | 9534424 A1 | 12/1995 |
| WO | 9603202 A1 | 2/1996 |
| WO | 9607470 A1 | 3/1996 |
| WO | 9628236 A1 | 9/1996 |
| WO | 9629142 A1 | 9/1996 |
| WO | 9641676 A1 | 12/1996 |
| WO | 9706880 A2 | 2/1997 |
| WO | 9822204 A1 | 5/1998 |
| WO | 9825694 A1 | 6/1998 |
| WO | 9828066 A1 | 7/1998 |
| WO | 9853902 A1 | 12/1998 |
| WO | 9901207 A1 | 1/1999 |
| WO | 9906326 A1 | 2/1999 |
| WO | 9908773 A1 | 2/1999 |
| WO | 99-55448 A1 | 11/1999 |
| WO | 9959707 A1 | 11/1999 |
| WO | 0018498 A1 | 4/2000 |
| WO | 0021890 A1 | 4/2000 |
| WO | 0030742 A1 | 6/2000 |
| WO | 0100307 A2 | 1/2001 |
| WO | 0105715 A1 | 1/2001 |
| WO | 0108790 A1 | 2/2001 |
| WO | 0119414 A1 | 3/2001 |
| WO | 0132299 A1 | 5/2001 |
| WO | 0136075 A1 | 5/2001 |
| WO | 0143856 A1 | 6/2001 |
| WO | 0145829 A1 | 6/2001 |
| WO | 0204100 | 1/2002 |
| WO | 0226363 A2 | 4/2002 |
| WO | 0230550 A1 | 4/2002 |
| WO | 0240140 A1 | 5/2002 |
| WO | 0247800 A1 | 6/2002 |
| WO | 03000389 A2 | 1/2003 |
| WO | 03013706 A1 | 2/2003 |
| WO | 03024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 03095078 A1 | 11/2003 |
| WO | 2004018084 A1 | 3/2004 |
| WO | 2004024304 A2 | 3/2004 |
| WO | 2004033078 A1 | 4/2004 |
| WO | 2004050221 A1 | 6/2004 |
| WO | 2004056458 A3 | 7/2004 |
| WO | 2004078327 A1 | 9/2004 |
| WO | 2004101120 A1 | 11/2004 |
| WO | 2005005028 A1 | 1/2005 |
| WO | 2005021140 A1 | 3/2005 |
| WO | 2005028085 A1 | 3/2005 |
| WO | 2005028086 A1 | 3/2005 |
| WO | 2005037414 A1 | 4/2005 |
| WO | WO 2005037414 A1 * 4/2005 ............ B01D 65/08 | |
| WO | 2005046849 A1 | 5/2005 |
| WO | 2005070215 A1 | 8/2005 |
| WO | 2005077499 A1 | 8/2005 |
| WO | 2005082498 A1 | 9/2005 |
| WO | 2005107929 A2 | 11/2005 |
| WO | 2006017911 A1 | 2/2006 |
| WO | 2006026814 A1 | 3/2006 |
| WO | 2006029456 A1 | 3/2006 |
| WO | 2006029465 | 3/2006 |
| WO | 2006047814 A1 | 5/2006 |
| WO | 2006066319 A1 | 6/2006 |
| WO | 2006066350 A1 | 6/2006 |
| WO | 2006126833 A1 | 11/2006 |
| WO | 2007022576 A1 | 3/2007 |
| WO | 2007053528 A2 | 5/2007 |
| WO | 2007065956 A1 | 6/2007 |
| WO | 2007073080 A1 | 6/2007 |
| WO | 2007135087 A1 | 11/2007 |
| WO | 2008025077 A1 | 3/2008 |
| WO | 2008034570 A1 | 3/2008 |
| WO | 2008071516 A1 | 6/2008 |
| WO | 2008141080 A1 | 11/2008 |
| WO | 2008153818 A1 | 12/2008 |
| WO | 2009030405 A1 | 3/2009 |
| WO | 2013048801 A1 | 4/2013 |
| WO | 2013049109 A1 | 4/2013 |

OTHER PUBLICATIONS

Almulla et al., "Developments in high recovery brackish water desalination plants as part of the solution to water problems," Desalination, 153 (2002), pp. 237-243.

Anonymous, "Nonwoven Constructions of Dyneon™ THV and Dyneon™ HTE Fluorothermoplastics", Research Disclosure Journal, Apr. 1999, RD 420013, 2 pages.

Australian First Examiner's Report dated Dec. 9, 2011 for Application No. 2008235254.

Chinese First Office Action dated Jul. 26, 2011 for Application No. 200880011059.3.

Chinese Second Office Action dated Jul. 3, 2012 for Application No. 200880011059.3.

Cote et al. "A New Immersed Membrane for Pretreatment to Reverse Osmosis," Desalination, 139 (2001), pp. 229-236.

Cote et al., "Immersed Membranes Activated Sludge Process Applied to the Treatment of Municipal Wastewater," Wat. Sci. Tech. 38(4-5) (1998), pp. 437-442.

Coulson et al., "Coulson and Richardson's Chemical Engineering," 1999, vol. 1, pp. 358-364.

Crawford et al., American Water Works Association Membrane Technology Conference, "Procurement of Membrane Equipment: Differences Between Water Treatment and Membrane Bioreactor (MBR) Applications," (2003).

Cui et al., "Airlift crossflow membrane filtration—a feasibility study with dextran ultrafiltration," J. Membrane Sci. (1997) vol. 128, pp. 83-91.

Davis et al., Membrane Technology Conference, "Membrane Bioreactor Evaluation for Water Reuse in Seattle, Washington" (2003).

DeCarolis et al., Membrane Technology Conference, "Optimization of Various MBR Systems for Water Reclamation" (2003).

Delgrange-Vincent et al., "Neural networks for long term prediction of fouling and backwash efficiency in ultrafiltration for drinking water production," Desalination 131 (2000) pp. 353-362.

Dow Chemical Company, "Filmtec Membranes—Cleaning Procedures for Filmtec FT30 Elements," Tech Facts, Online, Jun. 30, 2000, XP002237568.

Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.

Japanese Office Action dated Feb. 7, 2012 for Application No. 2010-501332.

Johnson, "Recent Advances in Microfiltration for Drinking Water Treatment," AWWA Annual Conference, Jun. 20-24, 1999, Chicago, Illinois, entire publication.

Jones, Craig, "Applications of Hydrogen Peroxide and Derivatives," The Royal Society of Chemistry, Cambridge, UK 1999, Chapters 2 and 5.

Kaiya et al., "Water Purification Using Hollow Fiber Microfiltration Membranes," 6th World Filtration Congress, Nagoya, 1993, pp. 813-816.

(56) References Cited

OTHER PUBLICATIONS

Kang et al. "Characteristics of microfiltration membranes in a membrane coupled sequencing batch reactor system," Water Research, 37(5) Mar. 2003, pp. 1192-1197, Elsevier, Amsterdam, NL.
Lloyd, D.R. et al. "Microporous Membrane Formation Via Thermally Induced Phase Separation/Solid-Liquid Phase Separation," Journal of Membrane Science, 52(3) (1990), pp. 239-261, Elsevier Scientific Publishing Company, Amsterdam, NL.
Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
Mark et al., "Peroxides and Peroxy Compounds, Inorganic," Kirk-Othmer Encyclopedia of Chemical Technology, Peroxides and Peroxy Compounds, Inorganic, To Piping Systems, New York, Wiley & Sons, Ed., Jan. 1, 1978, pp. 14-18.
MicroCTM—Carbon Source for Wastewater Denitrification. Information from Environmental Operating Solutions website including MSDS.
Nakayama, "Introduction to Fluid Mechanics," Butterworth-Heinemann, Oxford, UK, 2000.
New Zealand Examination Report dated Mar. 24, 2011 for Application No. 579779.
Ramaswammy S. et al. "Fabrication of Ply (ECTFE) Membranes via Thermally Induced Phase Separation", Journal of Membrane Science, (Dec. 1, 2002), pp. 175-180, vol. 210 No. 1, Scientific Publishing Company, Amsterdam, NL.
Rosenberger et al., "Filterability of activated sludge in membrane bioreactors," Desalination, 151 (2002), pp. 195-200.
Supplementary European Search Report dated May 7, 2012 for Application No. EP 08 73 3323.
U.S. Appl. No. 60/278,007, filed Mar. 23, 2001.
Ueda et al., "Effects of Aeration on Suction Pressure in a Submerged Membrane Bioreactor," Wat. Res. vol. 31, No. 3, 1997, pp. 489-494.
Water Encyclopedia, edited by Jay Lehr, published by John Wiley & Sons, Inc., Hoboken, New Jersey, 2005. Available at http://wwwmmrw.interscience.wiley.com/eow/.
Webster's Ninth New Collegiate Dictionary, Merriam-Webster Inc., Publishers, Springfield, Massachusetts, USA, Copyright 1986, p. 1298.
White et al., "Optimisation of intermittently operated microfiltration processes," The Chemical Engineering Journal, 52 (1993), pp. 73-77.
Wikipedia, "Seawater," available at http://en.wikipedia.org/wiki/Seawater, Jul. 15, 2007.
Yamamoto et al., "Direct Solid-Liquid Separation Using Hollow Fiber Membrane in an Activated Sludge Aeration Tank," Water Science Technology, 21 (1989), pp. 43-54.
Yoon: "Important operational parameters of membrane bioreactor-sludge disintegration (MBR-SD) system for zero excess sludge production" Water Research, 37 (2003), pp. 1921-1931, Elsevier, Amsterdam, NL.
Zenon, "Proposal for ZeeWeed® Membrane Filtration Equipment System for the City of Westminster, Colorado, Proposal No. 479-99," Mar. 2000, entire publication.
Schematic of 4" Geyser Pump, Geyser Pump Tech. Co., Nov. 13, 2005.
Miller et al., "Side Stream Air Lift MBR Development and Successful Application of a New Generation of MBR," Pollution Solutions Brochure, NORIT, The Netherlands, Apr. 2008.
Judd, "The MBR Book: Principles and Applications of Membrane Bioreactors in Water and Wastewater Treatment," (2006), pp. 174-178.
EPA, Membrane Filtration Guidance Manual, Nov. 2005.
Lu, et al., "The Influence of Bubble Characteristic on the Performance of Submerged Hollow Fiber Membrane Module Used in Microfiltration," Separation and Technology, 61 (2008), pp. 89-95.
Native Dynamics, Neutrium.com, "Pressure Loss from Pipe Entrances and Exits", Jan. 3, 2013.

* cited by examiner

MEMBRANE MODULE PROTECTION

CROSS-RELATED APPLICATIONS

This application claims priority under 35 U.S.C. §120 to U.S. patent application Ser. No. 12/594,376, filed on Oct. 2, 2009, titled "MEMBRANE MODULE PROTECTION," which is a national stage application and claims the benefit under 35 U.S.C. §371 of International Application No. PCT/AU08/00491, filed Apr. 4, 2008, which claims priority to Australian Provisional Patent Application No. 2007901821, filed Apr. 4, 2007, titled "MEMBRANE MODULE PROTECTION," each of which is incorporated herein by reference in their entirety for all purposes.

FIELD OF TECHNOLOGY

The present disclosure relates to filtration systems having one or more membrane modules comprising hollow fiber permeable membranes mounted therein, and more particularly, to the protection of said membranes and enhancement of module and system performance.

BACKGROUND

During membrane filtration processes, a feed liquid containing undesirable contaminants is forced through the pores of a membrane. The contaminants contained in the feed liquid do not pass through the pores of the membrane and accumulate on the outside of the membranes in the membrane module. Those particles cause membrane fouling and can clog membrane modules, making them less efficient. Liquid backwash, air scouring and chemical cleaning are common means to remove foulants from the module. However, the membranes in the modules still often suffer from packing by fibrous materials or damage by sharp objects contained within the feed liquid. Fibrous materials or trash may contact the membranes and may become caught around bundles or groups of membranes. In particular, when membranes are used for the pretreatment seawater, sharp shells from sea water often contact the membranes and cause damage to them.

Different methods have been proposed to protect the membrane modules from damage by materials and objects contained within a feed liquid. Pre-screening feed liquid is a common method employed to protect membrane modules from damage by materials in the feed liquid having a size greater than the pores of the membrane fibers. For example, in membrane bioreactors, a pre-treatment screen with perforated mesh is sometimes inserted between the biological tank and the membrane tank to protect the membranes and modules. In this arrangement however, a large pre-treatment screen has to be used and special aerators need to be installed to clean the pre-treatment screen. The large size of the screen and special aerators required to clean the screen present obstacles to efficiently operating such a bioreactor system.

Another method of protecting membranes includes holding a bundle of capillaries together with an open sleeve or casing. Coarse materials that may be contained in a feed liquid, such as hair, are filtered by the sleeve so that these materials can not intrude into the inner section of the membrane bundle. However, the method neglects to remove particles that are smaller than the sleeve opening. Small particles can pass through the open sleeve, move towards the membrane surface and inner fiber bundles, and agglomerate around and inside the membrane fiber bundles. It is difficult for these materials to be removed out of the open sleeve. Gradually these materials accumulate inside the membrane bundle and on the inner surface of the sleeve and the bundles eventually become packed with these materials. The accumulation of these materials can also cause membrane damage. The inability to effectively remove these materials when using an open sleeve configuration presents an obstacle to efficient filtration.

SUMMARY

In accordance with aspects and embodiments, a filtration system is provided comprising a membrane module comprising an upper header, a lower header, a plurality of hollow fiber membranes having an upper end potted in the upper header and a lower end potted in the lower header, a cage at least partially surrounding the plurality of hollow fiber membranes, and a screen in contact with and surrounding the cage, the filtration system further comprising an aeration cap coupled to the lower header of the membrane module.

In accordance with aspects and embodiments, a method of retrofitting a filtration system comprising at least one membrane module having hollow fiber membranes and a cage surrounding the hollow fiber membranes is provided, the method comprising positioning a screen around the cage of the membrane module.

In accordance with aspects and embodiments, a method of facilitating retrofitting a filtration system comprising at least one membrane module having hollow fiber membranes and a cage surrounding the hollow fiber membranes is provided, the method comprising providing a screen, and providing instructions to position the screen around the cage of the membrane module.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1A:
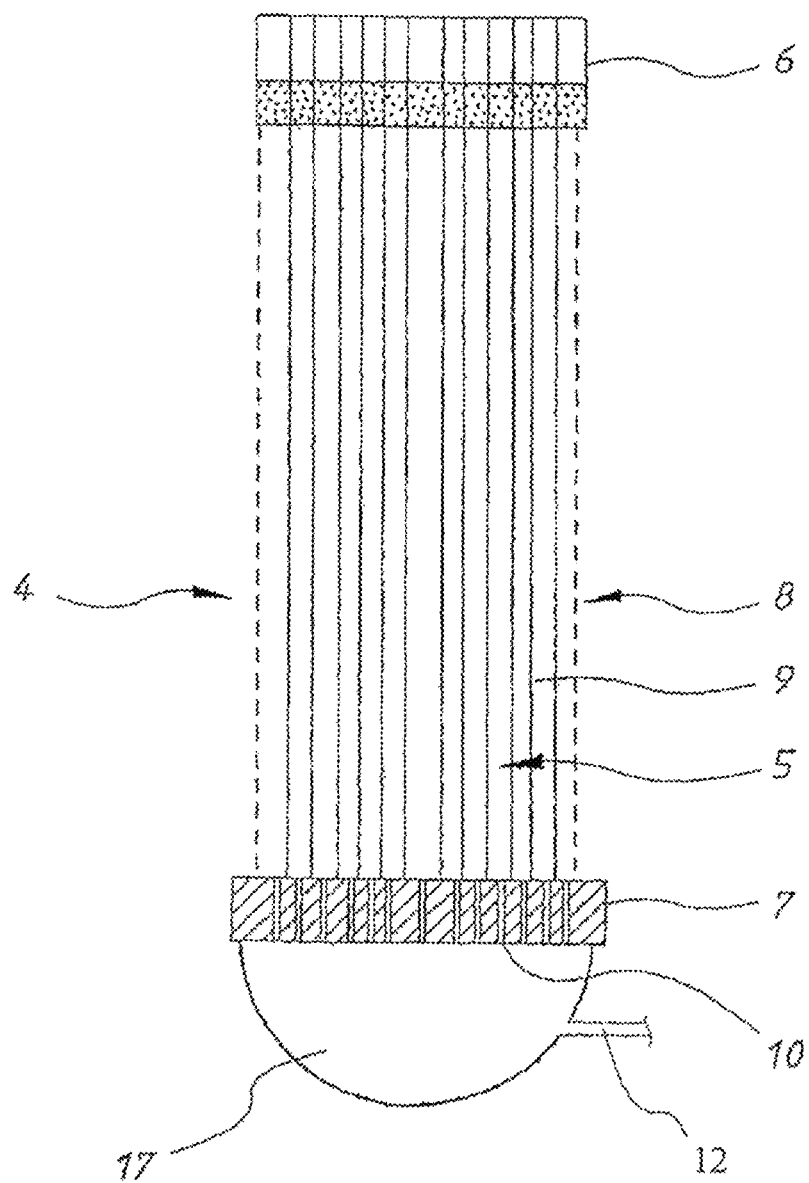
FIG. 1A is a cross-sectional view of a filtration system in accordance with one or more embodiments.

In accordance with aspects and embodiments of the present disclosure, a filtration system having an improved membrane module is disclosed. The modules of the present disclosure may advantageously protect membranes contained within a membrane module from coarse contaminants in a feed. The modules disclosed may thus improve the integrity of membranes and enhance the usable lifespan of a module. Aspects and embodiments of the present invention may improve the efficiency with which a filtration system having the improved modules of the present disclosure operates. This enhanced efficiency may reduce the cost of operating a filtration system.

A filtration system may comprise a plurality of membrane modules. Each module may have an upper header and a lower header, also referred to herein as an upper potting head or lower potting head, and a plurality of membranes positioned therebetween. The membranes may be porous membranes, and more specifically, may be hollow fiber membranes. The membranes may be potted in at least one of the upper header and the lower header. The membranes may be surrounded by a cage connect to, or disposed between, the headers that may maintain or assist in maintaining the membranes in close proximity to one another and the cage may also prevent excessive movement during filtration. The cage may be secured to the module at the upper potting head and the lower potting head. The cage may have an upper end potted in the upper potting head and a lower end potted in the lower potting head. The membranes, for example the hollow fiber membranes, may be closed at one end, or may, in the alternative, be open at both ends. The membrane modules may be disposed in one or more vessels. Liquid to be filtered, for example feed liquid containing or comprising contaminants, may be fed to the vessels. The feed liquid may comprise contaminants such as trash, foreign objects, and undesirable particles that are unsuitable for the filtrate's intended use. The contaminants may comprise coarse particles or sharp objects. A transmembrane pressure may be applied to the membrane module, causing the feed liquid to pass through the pores of hollow fiber membranes. A filtrate is collected from inside the membrane lumens. Contaminants larger than the membrane pore sizes do not pass through the membranes. These contaminants may become lodged in the membrane pores or accumulate on or around the membranes.

Contaminants in the feed liquid, such as coarse particles or sharp objects, may damage the hollow fiber membranes, reduce membrane integrity, and may reduce the usable lifespan of the membrane module. Aspects and embodiments of the present invention may protect the hollow fiber membranes disposed within a membrane module from coarse contaminants in the feed and may preserve and maintain membrane integrity for a period longer than experienced by an unprotected module.

The modules of the present disclosure may comprise a fine screen, referred to herein simply as a screen. The screen may protect the membranes in the module. The screen may be close-fitting around the module, and the modules of the present disclosure may be referred to as wrapped modules, or screen-wrapped modules.

Figure 1B:
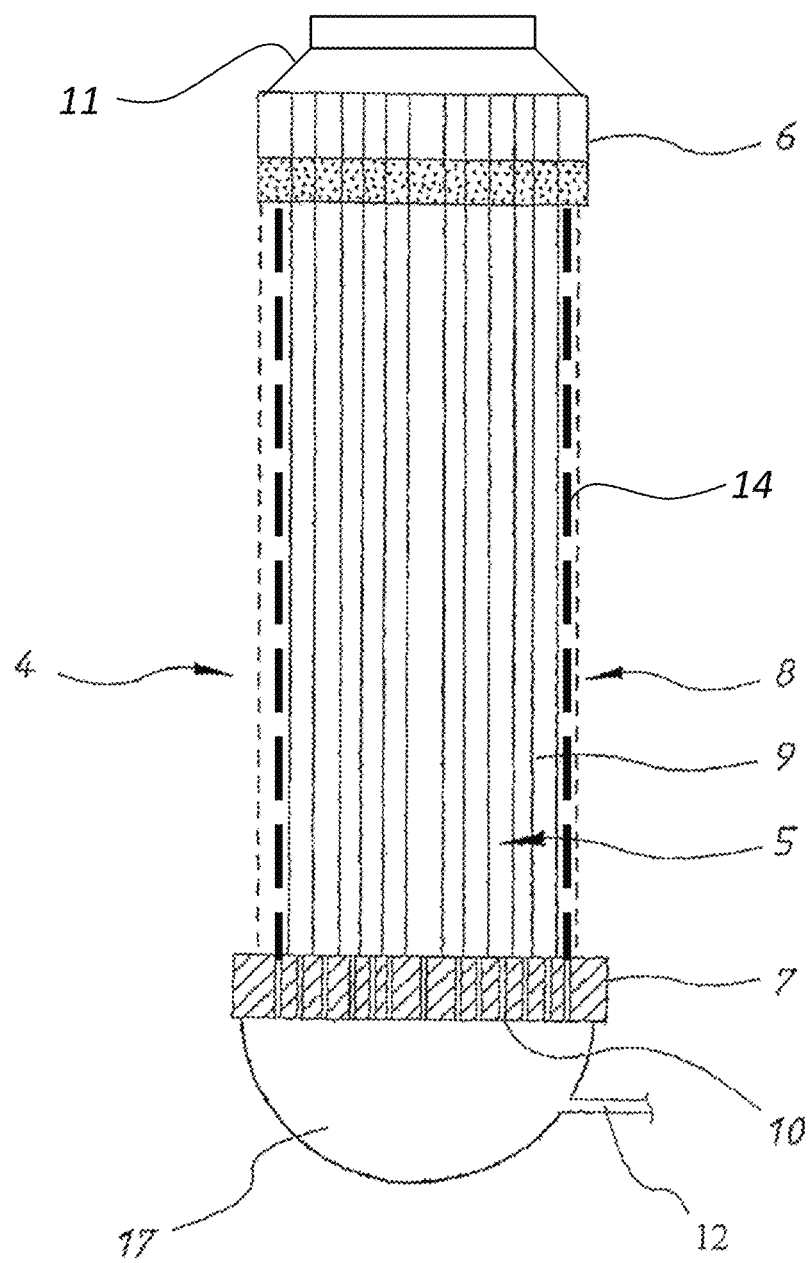
FIG. 1B is a cross-sectional view of a filtration system in accordance with one or more embodiments.

For example and referring to FIGS. 1A and 1B, membrane module 4 comprises an array, bundle, or plurality of hollow fiber membranes 5 extending longitudinally between upper potting head 6 and lower potting head 7. Referring to FIG. 1B, membrane module 4 may have cage 14 that holds membrane fibers 9 in close proximity to one another and prevents excess movement during filtration. The cage may be constructed of polyethelyene or polypropylene. The cage may have a series of horizontal and vertical bars that form a grid-like structure around membranes 5. Cage 14 may have openings in the range of about from 1 $mm^2$ to about 100 $mm^2$. Screen 8 surrounds cage 14 and membranes 5. Screen 8 provides a screening of feed liquid entering module 4 and may be said to be wrapped around module 4. Each of membranes 5 comprise a plurality of fibers 9 that are sealed at lower potting head 7 and are open at upper potting head 6 to allow for the removal of filtrate from the lumens of fibers 9. In use, module 4 is disposed in a filtration system and arranged vertically in a vessel, such as a feed tank. During filtration, filtrate is withdrawn from the upper potting head 6 and filtrate collection chamber 11 through suction applied to the open ends of the membrane lumens. The suction produces a pressure differential across the membrane walls resulting in feed liquid being drawn from the feed tank through the screen 8 and cage 14 and into contact with the hollow fiber membranes 9.

Screen 8 can be formed of any material suitable to wrap module 4, provide enhanced protection of membranes 5 of module 4, and improve a filtration system efficiency. The screen may be a self-supporting, rigid, hard material, or, the screen may be a flexible material. In accordance with some embodiments, the screen may be comprised of a fine mesh or fabric, such as cotton or nylon. In accordance with other embodiments, the screen may be comprised of polymeric materials, and may, for example, be polytetrafluorethylene (PTFE). The screen may be fabricated to fit the membrane module, and in some embodiments, may be in close proximity to, or in contact with, at least one of cage 14 and membranes 5. For example, screen 8 may comprise a flexible material fabricated to slide over and around a membrane module. The screen may have a seam that runs vertically along the module. Screen 8 may be formed to have similar characteristics of a sock and may be fabricated to fit module 4 tightly.

Figure 2:
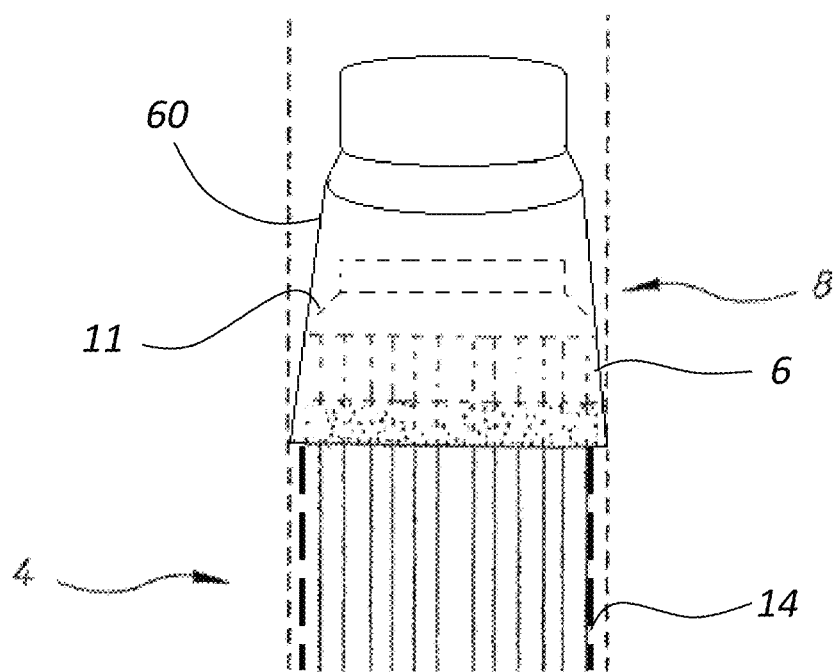
FIG. 2 is a cross-sectional view of a conical guide in accordance with one or more embodiments.

Screen 8 may have a cross-sectional area that is nearly identical to that of module 4. Screen 8 may be shaped similarly to module 4 and may have at least one open end, and may be installed by sliding an open end of screen 8 over and around module 4. A guide may be used to assist in placing screen 8 on module 4. Referring to FIG. 2, conical guide 60 may be used to facilitate placement of screen 8 around membrane module 4. Conical guide 60 may fit over upper potting head 6 and filtration collection chamber 11 such that screen 8 can be easily slid over module 4.

Screen 8 may mate with module 4. As used herein, the term "mate" or "mating" may describe any manner of connecting or joining two or more components together. The term "mate" or "mating" may describe any mechanical, thermal, or chemical process that connects or joins two or more components together. In the examples disclosed herein, the term "mate" or "mating" may mean welding, soldering, molding, adhering, snapping, interlocking, fastening or otherwise connecting two components. In certain examples, screen 8 and module 4 may be mated by being fastened together with the assistance of another component, thereby forming a connection. Module 4 may, for example, comprise protrusions, grooves, or other structural features that facilitate mating, fitting, and securing screen 8 to module 4. Screen 8 may mate with and be secured to module 4 by fasteners, such as cable ties.

Figure 3:
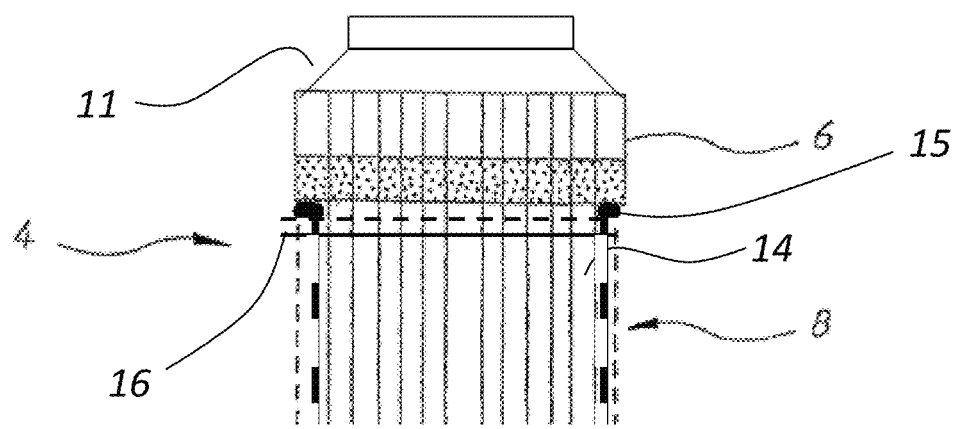
FIG. 3 is a cross-sectional view of a membrane module in accordance with one or more embodiments.

Referring to FIG. 3, module 4 comprises groove 15 positioned at the upper end of the module and below the upper potting head. Screen 8 is positioned below groove 15 and secured by fastener 16. Groove 15 and fastener 16 prevent upward vertical movement of screen 8. A similar groove and fastener may be positioned at the lower end of the module to prevent downward vertical movement. Module 4 may comprise additional grooves and screen 8 may be secured by additional fasteners. Alternative configurations of protrusion, fasteners, and other mating features, may be used to secure screen 8 to module 5 and these features be located in any configuration and in any location on module 4. Alternatively, screen 8 may be self-securing such that when screen 8 is positioned around module 4, screen 8 secures to the module without the necessity of further securing devices.

Screen 8 has apertures that are sized to reject debris and contaminants that are present in a feed liquid entering the membrane module. Screen 8 may comprise apertures having any geometry, including apertures that are square, rectangular, circular, oblong, and polygonal. The apertures of screen 8 may be formed in a piece of woven material, or the apertures of screen apertures 8 may be the void space between the threads of a woven material, itself. Though aperture size within a screen may vary, screen 8 may have an average aperture size, where average aperture size is defined by the average diameter or width of apertures, in the range of from about 1 µm to about 100 µm, from about 10 µm to about 350 µm, and most preferably, in a range of from about 30 µm to about 150 µm.

Contaminants having an aperture size greater than the aperture size of screen 8 will be rejected by screen 8. Particles having an aperture size equal to screen 8 may lodge in the apertures of the screen. Larger contaminant particles may also accumulate on the outer surface of the screen and block apertures.

Contaminants that have a size less than the aperture size of screen 8 will pass through screen 8 during filtration and contact the hollow fiber membranes. Contaminants having a size greater than the pores of fibers 9 will then be rejected by the hollow fiber membranes. Contaminants that pass through screen 8 and are rejected by membrane fibers 9 may build up on the membrane fibers and accumulate in the space between screen 8 and membranes 5. Contaminant accumulation on screen 8, accumulation on membrane fibers 9, and contaminant build up in the space between screen 8 and membranes 5 may need to be removed to maintain module efficiency.

The build-up of contaminants on screen 8 and membranes 5 may present an obstacle to efficient filtration. Screen 8 and membranes 5 may require cleaning to remove contaminant build up. In accordance with aspects and embodiments, cleaning membranes 5 may also efficiently, effectively, and simultaneously clean screen 8.

To remove contaminants from screen 8 and membranes 5, a gas, typically air, may be introduced into the bottom of membrane module 4 to produce gas bubbles. The bubbles may scrub the solids accumulated on the membrane surfaces and also may result in the vibration and scouring of screen 8. Cleaning chemicals such as chlorine may be added to the gas providing the bubbles to further assist in the cleaning process. This process, which may be referred to as a gas bubble aeration cleaning process, may be used in conjunction with backwashing regimes, including liquid backwashing, pressurized gas backwashing, and combinations of both, as well as with chemical cleaning and dosing arrangements.

Referring back to FIGS. 1A and 1B, membrane module 4 has a plenum chamber 17. Lower potting head 7 has a number of holes 10 uniformly distributed therein to enable gas or air to be supplied therethrough from a feed line 12 and plenum chamber 17 located below the aeration holes 10. Plenum chamber 17 may be an aeration cap fitted below the lower potting head 7. Membrane fibers 9 are fixed uniformly within upper potting head 6 and lower potting head 7 and aeration holes 10 are formed uniformly relative to each membrane fiber 9 so as to provide, in use, a uniform distribution of gas bubbles between the fibers.

The gas bubble cleaning process may be used in conjunction with a backwash, and may be used continually during filtration to clean the modules. Membrane modules may be continuously aerated during filtration, and aeration may continuously dislodge contaminants from the membranes. Continuously aerating module 4 may thus reduce the build-up of contaminants on screen 8 and membranes 5 and enhance filtration efficiency.

Continuous aeration of the module may however increase operating costs. In continuously aerated non-wrapped modules, for example, in modules without screen 8, aeration contributes substantially to operating cost. In a wrapped module however, there is a pressure drop across screen 8 in addition to the pressure drop experienced across membranes 5. Screen 8 thus may increase the transmembrane pressure in module 4. Aeration flow rates in a screen-wrapped module may be reduced by up to about 40% at a constant transmembrane pressure as compared to comparable non-wrapped modules. The transmembrane pressure increase in module 4 may allow the aeration flow rate to module 4 to be reduced without reducing the filtration efficiency of the module. Using screen-wrapped modules may enable reduced aeration flow rates, which may result in substantial cost savings as compared to filtration systems using traditional, unwrapped, modules.

Solids removed in the cleaning process may be intermittently or continuously removed. Solids may be removed by a drain-down of the module or may be removed during filtration. Removing solids during filtration, however, requires an egress in the module or filtration system to allow the free-flow of contaminants accumulated between screen 8 and membranes 5 out of the system. A modified aeration cap or opening in screen 8 may be used to facilitate the egress of contaminants from the module.

Figure 4:
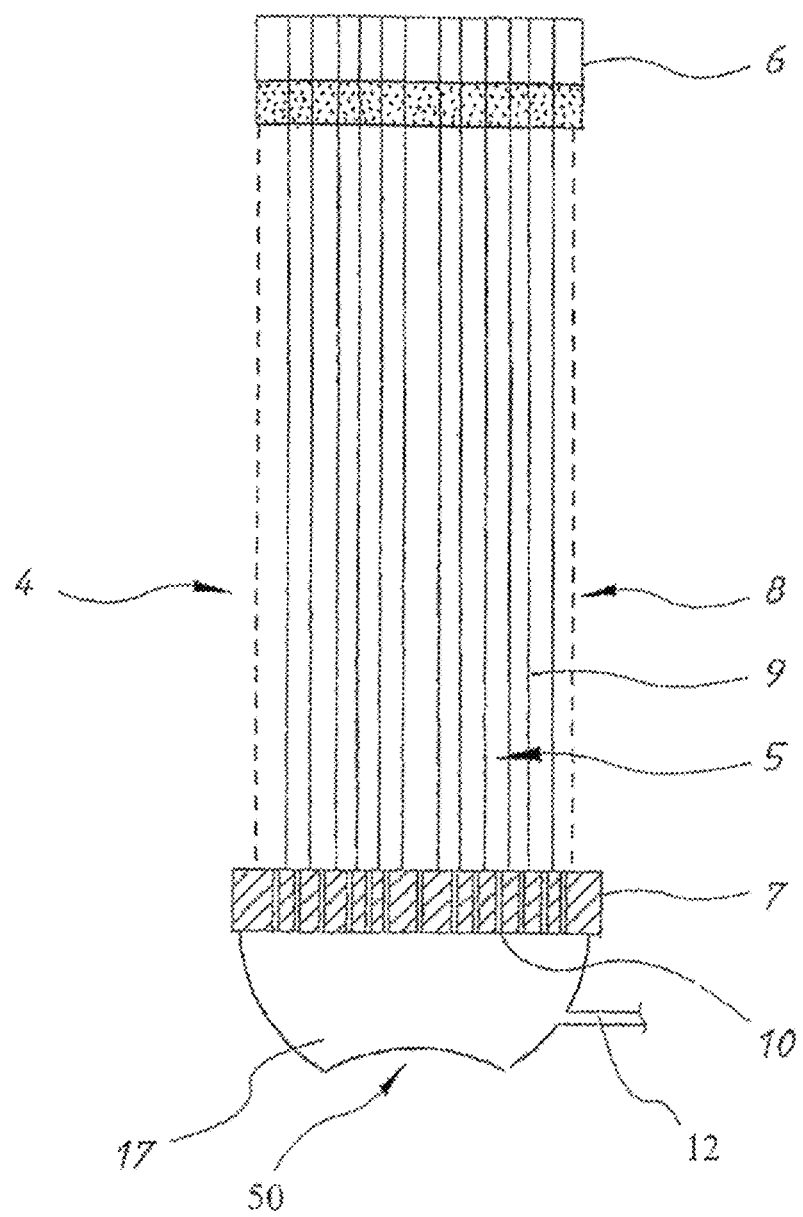
FIG. 4 is a cross-sectional view of a filtration system in accordance with one or more embodiments.

For example and referring to FIG. 4, plenum chamber 17 includes opening 50 formed beneath feed line 12. During filtration, feed liquid enters the membrane module primarily through screen 8, and to a lesser extent through opening 50. The feed liquid is then applied to fibers 9 in the usual manner. Concentrate comprising rejected contaminants and trash accumulated within the module 4, between membranes 5 and screen 8, is able to egress via opening 50, either of its own accord under gravitational influence, or by virtue of gas bubble scouring, backwashing flows, drain down of the tank, or the like.

Figure 5A:
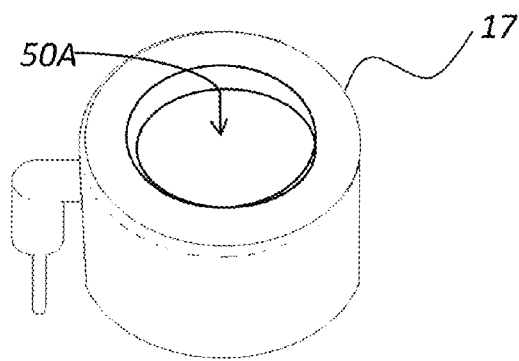
FIGS. 5A-5C are perspective views of modified aeration caps in accordance with one or more embodiments.
Figure 5B:
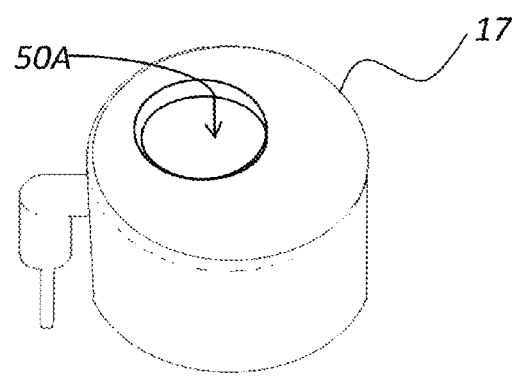

Opening 50 of plenum chamber 17 may be an orifice in a modified aeration cap and may have a variety of configurations to allow accumulated contaminants to flow out of the module. Opening 50 may have any shape, and may be circular, rectangular, or comprise a plurality of orifices. The orifices that comprise an opening may have any shape. An aeration cap may, for example, be modified to have a single opening, or may, for example, have an opening comprising a plurality of orifices. Referring to FIG. 5A, modified aeration cap 17 may be substantially unsealed and may for example, have an opening 50A that is equal to or greater than the cross-sectional area of the aeration cap, and may for example, be about 200 mm in diameter. Referring to FIG. 5B, modified aeration cap 17 may, in the alternative, have an orifice 50B that is substantially less than the diameter of the aeration cap. For example, orifice 50B may be less than about 200 mm, and may have a diameter, for example, of between about 25 mm to about 75 mm. Further and referring to FIG. 5C, modified aeration cap 17 may have an opening 50C comprising a plurality of orifices and for example, may comprise two orifices. The orifices in plurality of orifices may each have a diameter in the range of about 5 mm to about 20 mm. In certain embodiments, orifices 50C of modified aeration cap 5C may be about 8 mm. The opening in a modified aeration cap may be positioned in the center of the aeration cap or may be positioned off-center.

When using a modified aeration cap, feed liquid in the filtration system may enter the membrane module through the aeration cap opening. Flow that enters through the modified aeration cap may be referred to as bypass flow because it bypasses the screen surrounding the module. The percentage of bypass flow is generally dependent on the size of the aeration cap opening and the material and aperture size of the screen. Larger openings allow for more feed liquid to enter the module than smaller openings. Certain materials, such as cotton, cause a higher percentage of feed to bypass the screen, whereas other materials, such as a screen comprising nylon with a similar aperture size to that of a screen comprising cotton, cause less bypass flow. Further, when screens having larger average aperture sizes are used in conjunction with a modified aeration cap, the module experiences less bypass flow.

Modifications may be made to a feed entry port, such as an opening in the aeration cap or plenum chamber, to reduce any decreases in effectiveness that may result from bypass flow through the feed entry port. Bypass flow, in general, may decreases the effectiveness of wrapping module 4 with screen 8 due to the ingress of coarse contaminant matter through opening 50. Any loss in efficiency as a result of bypass flow, however, may generally be balanced by advantages stemming from the free flow of concentrate and waste, including coarse contaminant matter capable of damaging membranes 5, outwardly through opening 50. Modifications to a feed entry port may further mitigate possible negative effects of bypass flow.

Figure 6A:
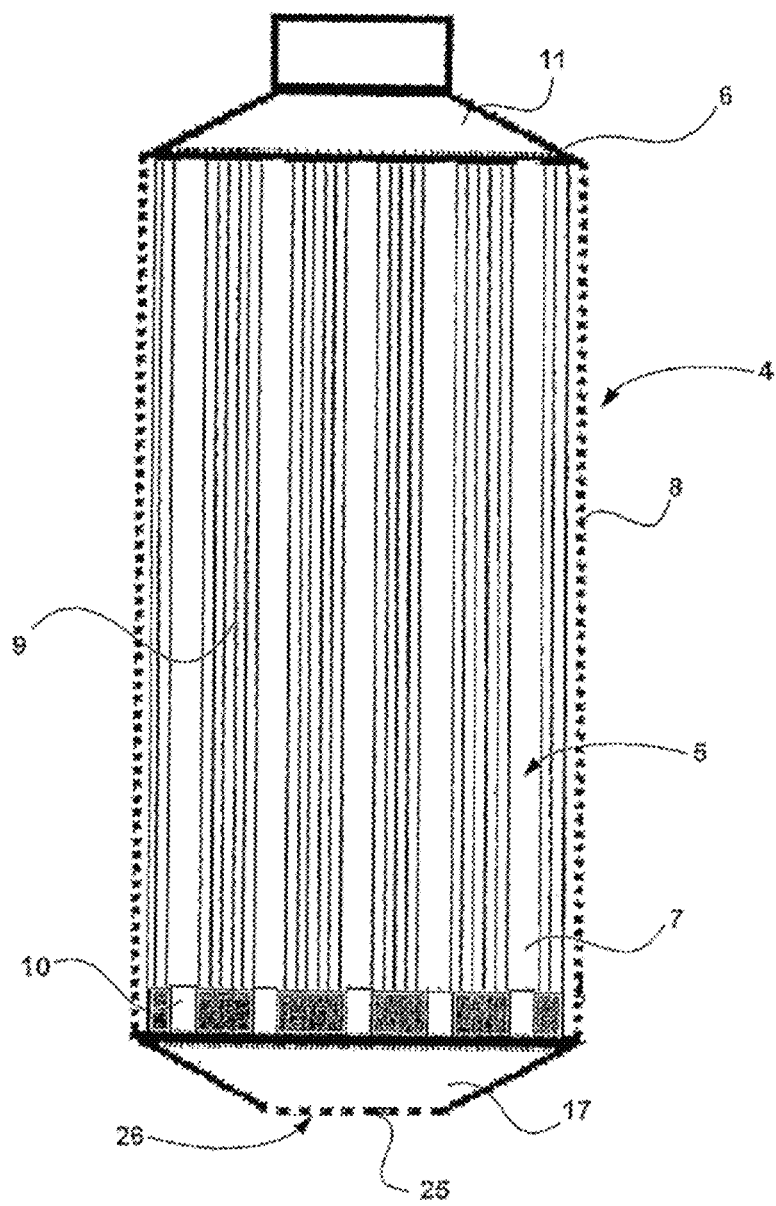
FIG. 6A is a cross-sectional view of a filtration system in accordance with one or more embodiments.
Figure 6B:
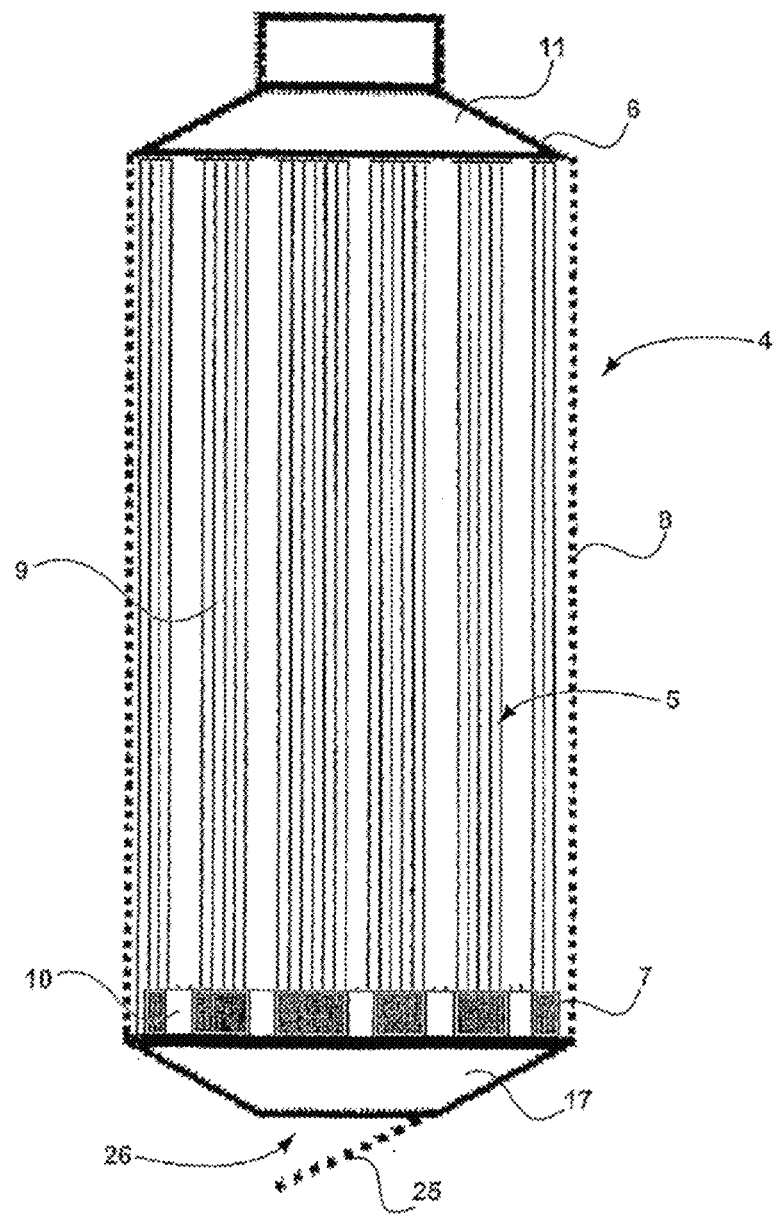
FIG. 6B is a cross-sectional view of a filtration system in accordance with one or more embodiments.

For example, referring to FIGS. 6A and 6B, a selectively operable screen 25 may be provided across feed entry port 26. Feed liquid enters membrane module 4 through port 26 and flows through screen 25 into membrane module 4, where it is applied to membranes 9 in the usual manner. When concentrate and other waste has accumulated within module 4, screen 25 is opened, as shown in FIG. 6B, to allow the free flow of concentrate and waste out of module 4 through port 26. It will be appreciated that a similar effect could be achieved by having an inflow path which is screened and an outflow path which is unscreened. Similarly, portions of screen 8 could be provided with selectively operable openings to provide a similarly advantageous operation.

Figure 7:
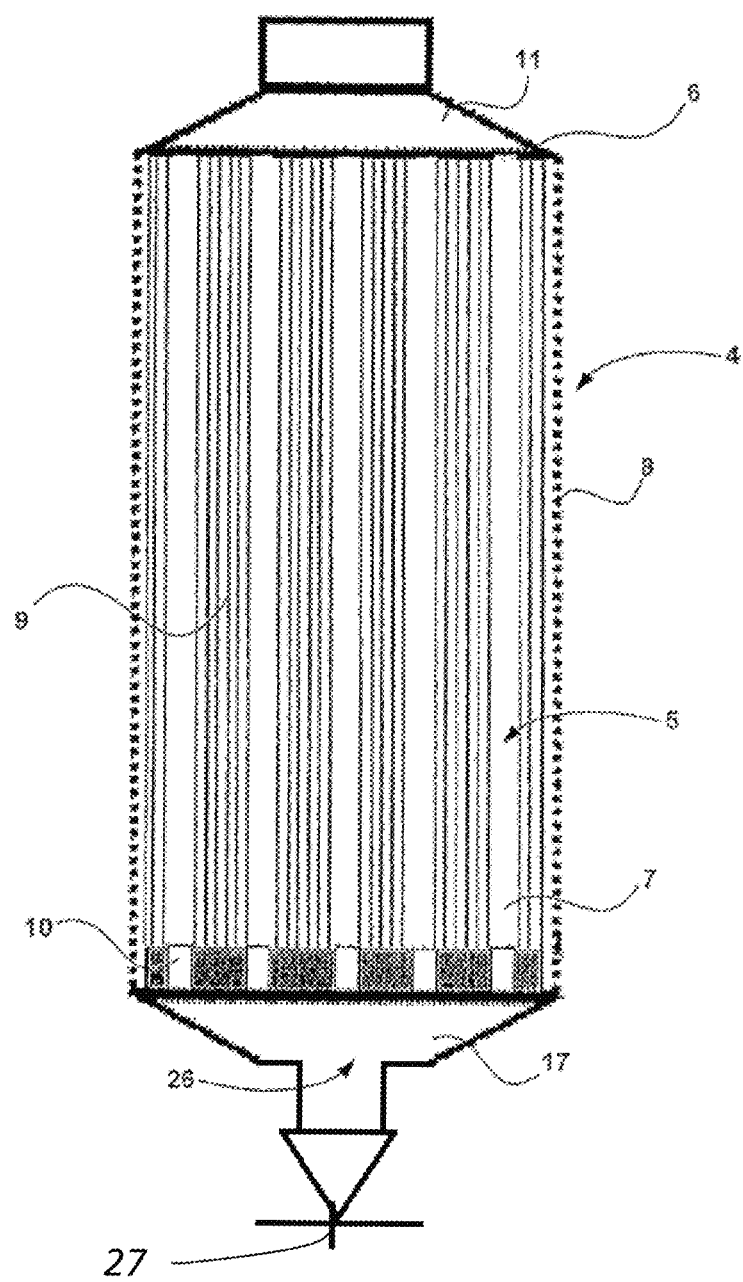
FIG. 7 is a cross-sectional view of a filtration system in accordance one or more embodiments.

In the alternative and referring to FIG. 7, a non-return valve 27 may be positioned upstream of feed entry port 26. Non-return valve 27 may provide for flow of waste out of module 4 and prevent feed from entering the module through feed entry port 26. A non-return valve 27 may eliminate up to about 100% of bypass flow.

Figure 8:
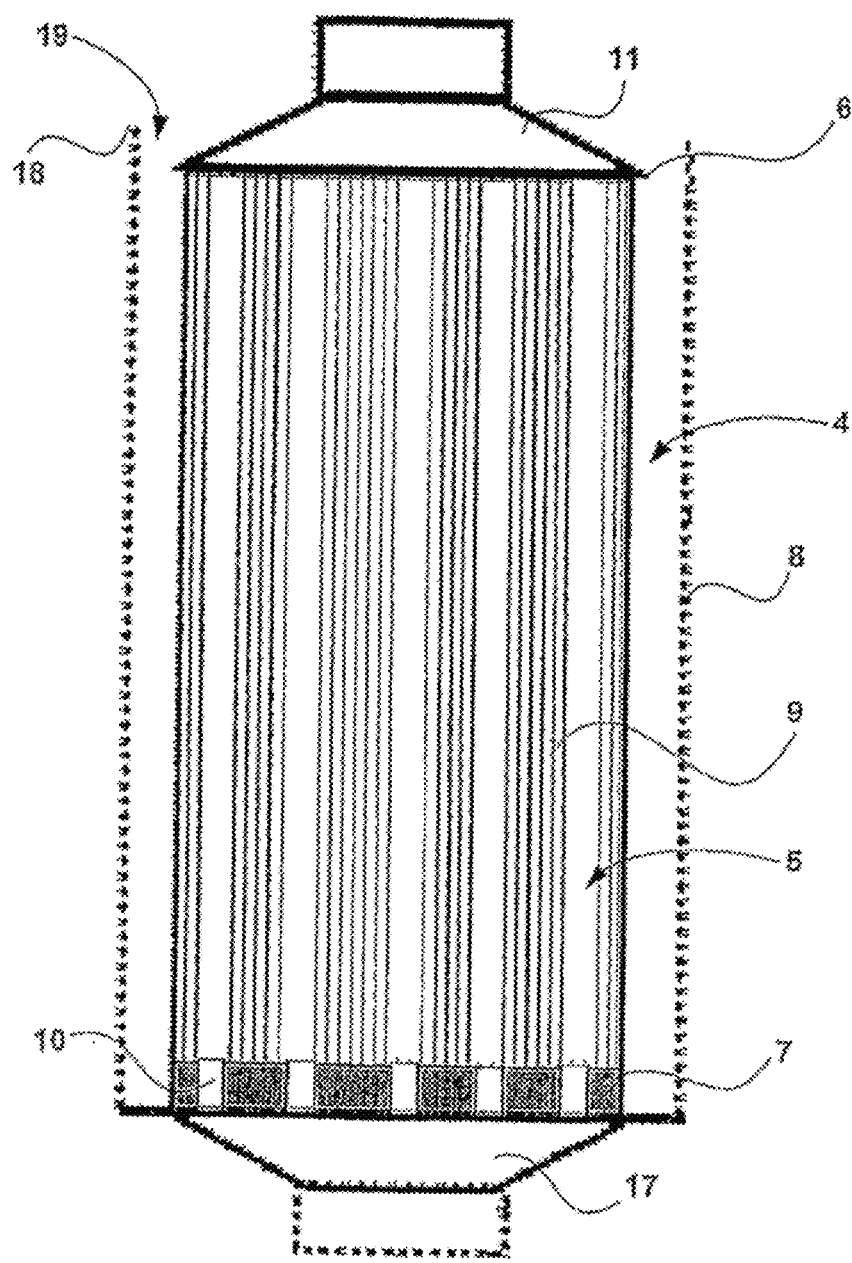
FIG. 8 is a cross-sectional view of a filtration system in accordance with one or more embodiments.
Figure 9:
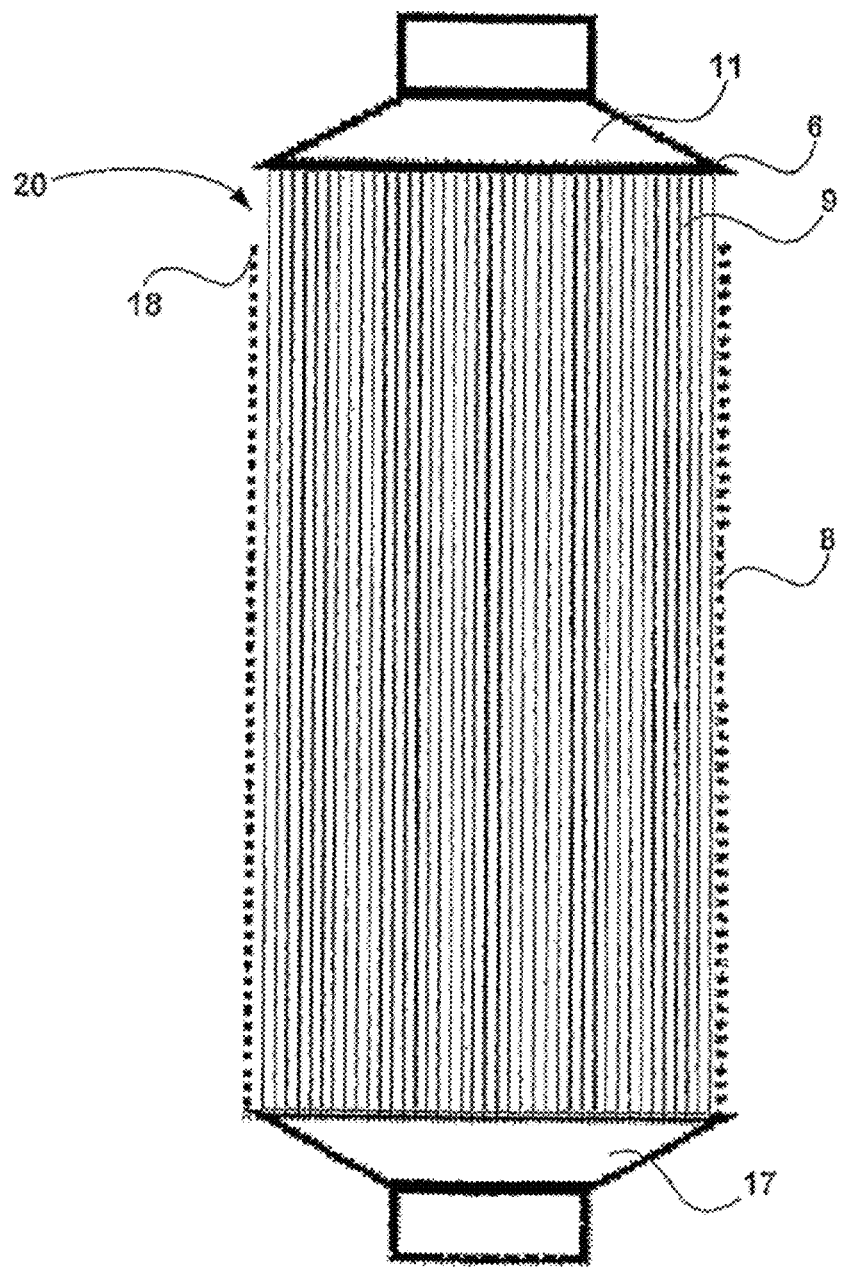
FIG. 9 is a cross-sectional view of a filtration system in accordance with one or more embodiments.

In other embodiments, the bottom of module 4 may be sealed and the screen surrounding the module may be positioned or modified to allow the egress of accumulated contaminants out of the module. For example and referring to FIG. 8, module 4 has screen 8 surrounding membranes 5. Screen 8 is spaced from the periphery of module 4 while extending the full length of module 4. Screen 8 is attached to lower potting head 7 but open at its upper end 18 adjacent upper potting head 6 to define opening 19. In use, feed liquid flows through screen 8 into contact with the membranes 5. Concentrate produced during filtration, gas bubble scouring, and backwash flows out of module 4 through opening 19.

In the alternative, an opening may be formed between the top of a screen and the bottom of an upper potting head to provide a path for contaminants to escape. For example and referring to FIG. 3, screen 8 does not extend fully to upper potting head 6 and gap or opening 20 is provided between end 18 of screen 8 and upper potting head 6. Opening 20 again allows concentrate to flow out of module 4. Alternatively, gap or opening 20 may be formed in screen 8, itself, but may have a larger aperture size than the average size screen apertures to allow concentrate to flow out of the module 4 through opening 20 in screen 8.

Figure 10A:
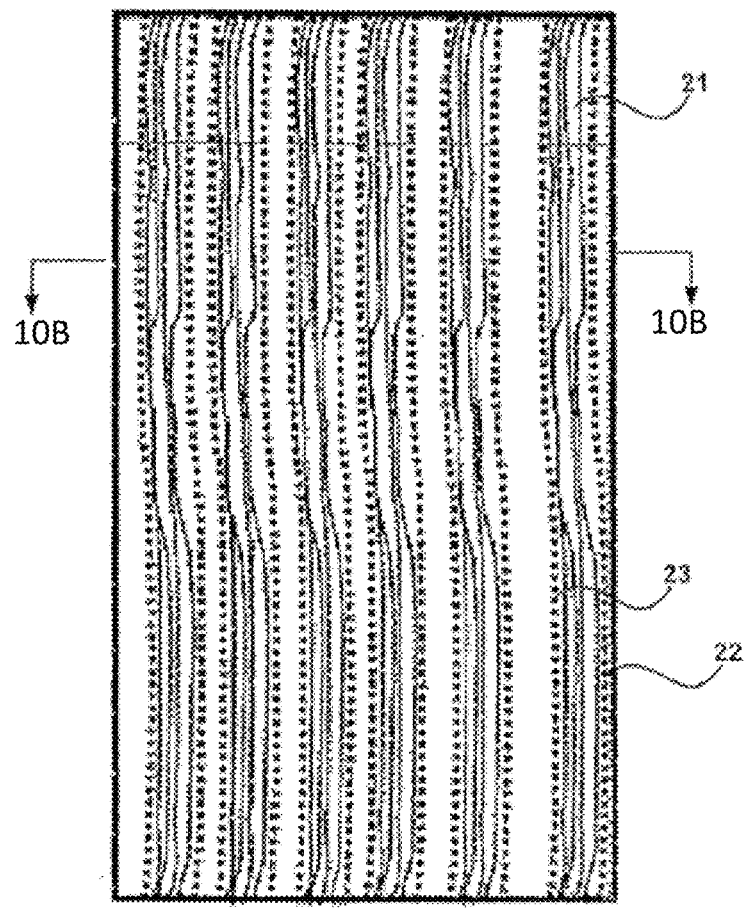
FIG. 10A is a cross-sectional view of membranes in accordance with one or more embodiments.
Figure 10B:
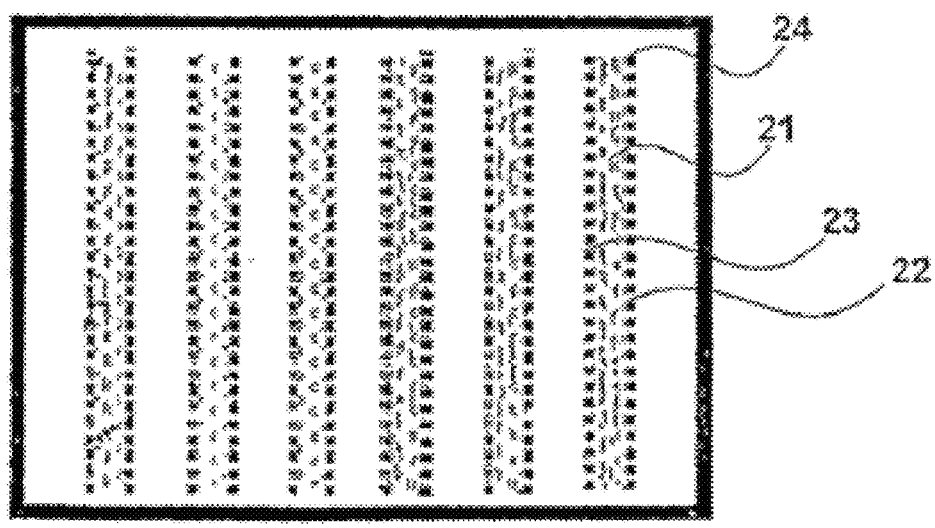
FIG. 10B an exploded cross-sectional view of membranes in accordance with one or more embodiments.

FIGS. 10A and 10B show an embodiment where fiber membrane mats 21 are used in the module. In this arrangement, each mat 21 is provided with co-extensive protection screens 22 and 23 which are provided on each side of each mat 21 and extend between upper potting head 6 and lower potting head 7. As best shown in FIG. 10B, screens 22 and 23 are open adjacent edges 24 of the mats 21 to allow outward flow of concentrate.

Existing water treatment systems may be retrofitted by providing and implementing the modifications discussed herein in accordance with one or more embodiments. For example, an existing filtration system comprising membrane modules may be retrofitted with one or more of the enhancements and modifications discussed herein. The modifications and enhancements may be used individually, or in combination. For example, one or more modules of an existing filtration system may be retrofitted with a modified aeration cap in accordance with aspects and embodiments, may be retrofitting with screen according to aspects and embodiments, or may be retrofitted with both.

Improved and modified filtration systems of the present disclosure may be able to produce a filtrate at a lower energy than traditional filtration systems by providing and implanting the modifications discussed herein in accordance with one or more embodiments, for example, by enabling lower aeration rates to be provided to the system while maintaining a constant transmembrane pressure. In addition, aspects and embodiments disclosed may improve the usable lifespan of membrane modules and maintain module integrity, reducing the overall capital cost of operating and maintaining a filtration system employing membrane modules.

The function and advantages of these and other embodiments can be further understood from the examples below, which illustrate the benefits and/or advantages of the one or more systems, methods, and techniques but do not exemplify the full scope of the invention.

EXAMPLES Bench studies were conducted using Siemens Memcor® S10 VAB modules. The properties of a standard S10 VAB module are shown in Table 1.

TABLE 1

| Fiber Diameter (Inner Diameter/ Outer Diameter) | Fiber Length | Fiber Count | Surface Area |
|---|---|---|---|
| 600 μm/800 μm | 1.05 m | 10560 | 27.87 m$^2$ |

Figure 11:
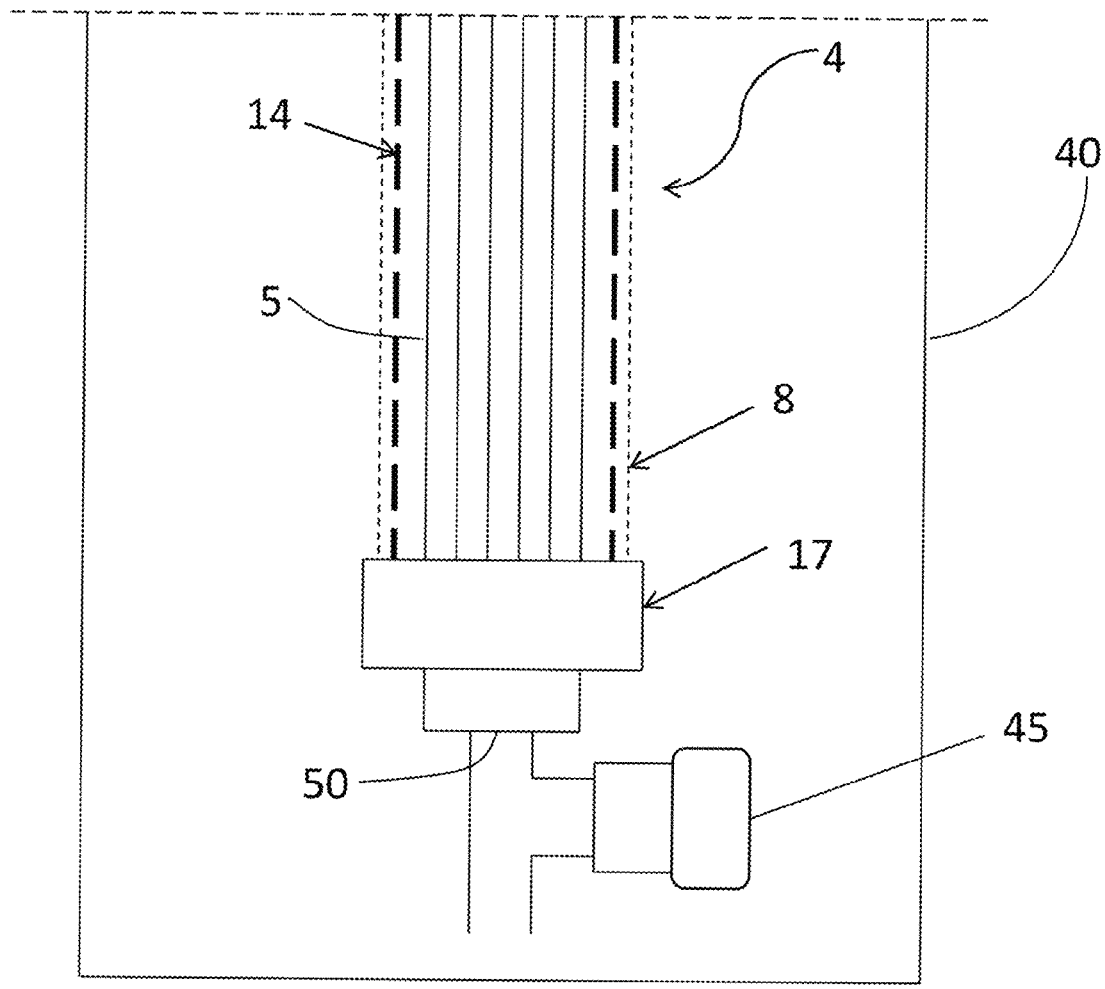
FIG. 11 presents a cross-sectional view of the filtration system used in the accompanying Examples described herein in accordance with one or more embodiments.

As shown in FIG. 11, an S10 VAB module 4 having membranes 5 and cage 14 was wrapped with screen 8. Different material screens having a variety of average aperture sizes were tested. The screens were manufactured to be fit around module 4 with the assistance of a conical guide. The screens fit module 4 tightly and featured a longitudinal seam and had cuffs at both ends that housed cable ties. The cable ties were used to fasten the screen to the module. To prevent vertical movement of the screen, grooves were machined into the module to facilitate fastening the screens to the module and to prevent screen movement during filtration. The different screens tested are presented in Table 2.

TABLE 2

| Average Screen Aperture Size (μm) | Screen Material |
|---|---|
| 48 | Nylon |
| 64 | Nylon |
| 90 | Nylon |
| 50 | Cotton |
| 150 | Cotton |
| 38 | Polytetrafluoroethylene (PTFE) |

Figure 5C:
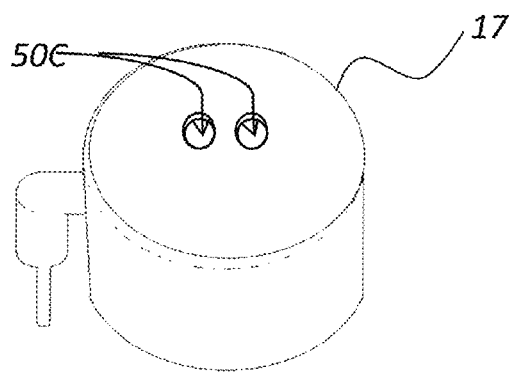

In order to investigate the increase in transmembrane pressure caused by wrapping module 4 with screen 8, pressure transducers were installed on the aeration discharge of the modules so that the back pressure during backwash sequences could be measured and recorded. Trials were conducted using sealed and modified aeration caps. The modified aeration caps tested are shown in FIGS. 5A-5C. Modified aeration caps 17 having openings 50 were installed in on screen-wrapped modules to create a channel for solids-laden backwash waste from within the screen enclosed area to escape. A modified aeration cap having a three inch orifice, also referred to as an unsealed cap (FIG. 5A), a modified aeration cap having a one inch orifice (FIG. 5B), and a modified aeration cap having two 8 mm orifices (FIG. 5C), were tested. Different screens were also investigated in conjunction with modified aeration caps to determine the impact of average screen aperture size and screen material on bypass flow.

In order to quantify the amount of flow bypassing screens 8 through the openings 50 of modified aeration caps 17, screen-wrapped S10V modules were used to filter feed liquid in a tank that provided enough room for a submerged magnetic flow meter to be mounted underneath the modified aeration caps. Referring to FIG. 11, module 4 was fitted with a magnetic flow meter 45 and placed in a vessel 40. Feed liquid (not shown) was introduced into vessel 40 and filtered by module 4. Bypass flow entered through opening 50 and was measured by meter 45.

Example 1

Impact of Screen Aperture Size and Screen Material on Bypass Flow

Figure 12:
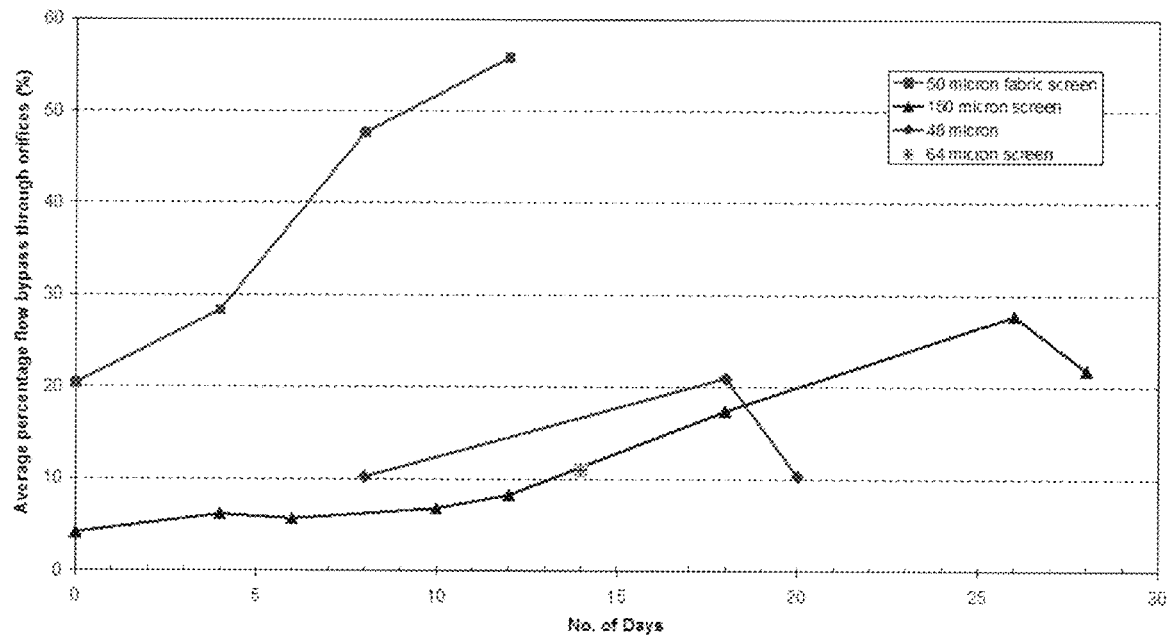
FIG. 12 presents data discussed in accompanying Example 1 in accordance with one or more embodiment.

Bypass flow was measured for in a filtration system comprising a screen-wrapped module equipped with a modified aeration cap having two 8 mm orifices (See FIG. 5C). Bypass flow data was collected for modules wrapped with 48 μm and 64 μm nylon screens and 50 μm and 150 μm cotton screens. Each module was operated at a filtration interval of 20 minutes. The modules were also tested with a PVC insert between the wrapped module and the tank to simulate scaled-up, field, conditions. Bypass flow data, shown in FIG. 12, was collected in terms of the average bypass flow through the modified aeration cap as a percentage of the total flow to the module.

The data indicates that the amount of bypass flow decreases with an increase in the average screen aperture size for the same material. The data further reveals that the use of a cotton screen is disadvantageous with regard to bypass flow as the 50 μm cotton screen produces a much higher bypass flow percentage compared to the 48 μm nylon screen. This difference may be attributable to the difference in the way the threads are woven in the different screen materials.

Example 2

Impact of Average Screen Aperture Size on Hydraulic Performance

The impact of average screen aperture size on hydraulic performance was analyzed by measuring the permeability, flux, and fouling rate of the module. Modules were run at a flux of between 50 and 60 liters per square meter per hour (LMH) and a filtration interval of 20 minutes. Data was first collected on an S10 module wrapped with a 64 μm nylon screen. The wrapped module was run for a period of 55 days. Permeability was measured at 20° C. as a function of LMH/Bar, flux was measured in terms of LMH, and the fouling rate was measured as a function of the feed fouling index (FFI).

FFI characterizes the fouling nature of feed liquid and monitors the performance of a filtration unit. The FFI of a stream measures the fouling rate of the feed normalized to 20° C. and the calculation is an estimate of the rate of increase in resistance when a given volume of feed is filtered per unit area of membrane. The standard engineering units defined for FFI are $m^{-2}$. However, in practice, the resulting value is a large number. FFI is therefore generally divided by $10^{12}$, which typically gives values in the range of approximately 1-100.

The formula used by to calculate FFI is:

$$FFI = \frac{(R_2 - R_1) \times N \times A \times 1000}{V_{(R_1 \to R_2)}}$$

Where:
FFI=Feed Fouling Index (FFI units or $m^{-2} \times 10^{12}$)
R1=Initial Resistance for the filtration interval (R units or $m^{-1} \times 10^{12}$)
R2=Final Resistance for the filtration interval, calculated just before backwash (R units or $m^{-1} \times 10^{12}$)
N=Number of Filtration Modules that are filtering
A=Nominal surface area of each Filtration Module ($m^2$)
V=The total volume of filtrate produced between R1 and R2 (litres).

After collecting data, the screen was replaced with a 48 μm screen and data was collected for an additional 35 days. Permeability, which was observed as stable at about 160 LMH/Bar for the seven days before 64 μm screen was replaced with the 48 μm screen.

After the 64 μm screen was replaced with the screen having smaller aperture sizes, the permeability decreased from 160 LMH/Bar to about 105 LMH/Bar over the next 7 days, whereas turbidity in the feed liquid remained stable. Over the first seven days after the switch, the FFI also more than doubled. Hydraulic performance deteriorated and the fouling rate increased with the use of the smaller, 48 μm screen, evidencing the impact of average aperture size on module performance. This testing demonstrates that utilizing a screen with a larger average aperture size may enhance module performance as compared to using screens with smaller average aperture sizes.

Example 3

Impact of Aeration Cap Design-Sealed vs. Unsealed Caps

An S10 screen-wrapped module wrapped with a nylon screen having an average pore size of about 90 μm was run with a sealed aeration cap and an unsealed aeration cap. The unsealed aeration cap had an orifice of about three inches. Filtration data was collected using both the sealed and unsealed cap at various aeration flow rates.

Figure 13:
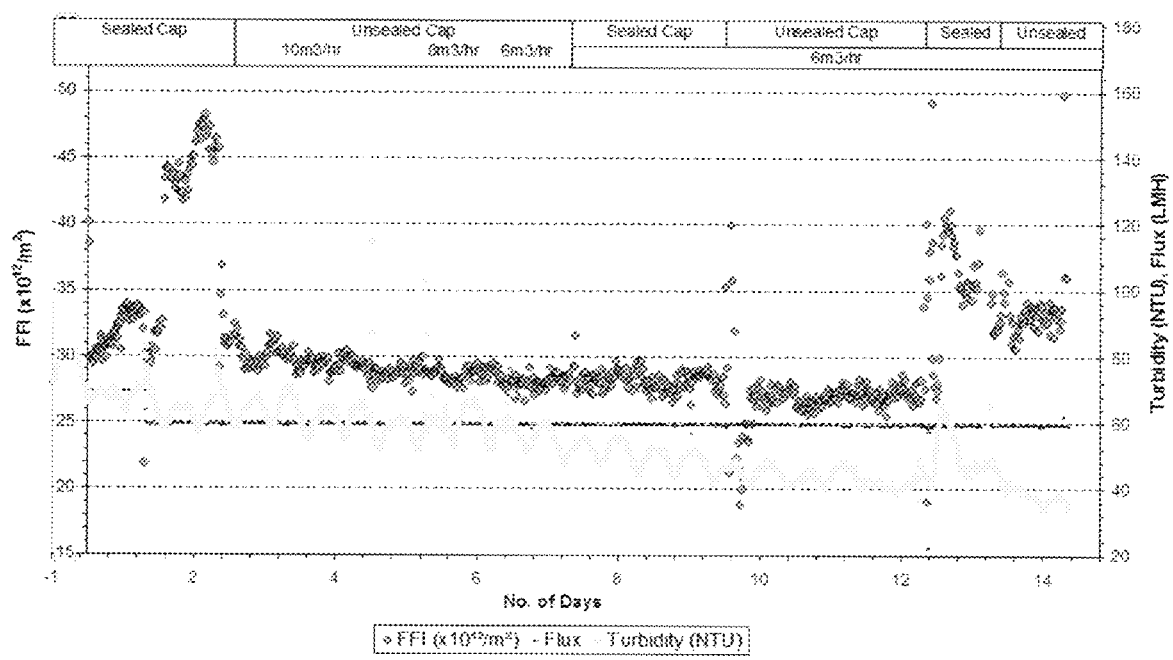
FIGS. 13-15 present data discussed in accompanying Example 3 in accordance with one or more embodiments.

Data was collected on the turbidity of the feed liquid in nephelometric turbidity units (NTU), and data was also collected on the module flux and the feed fouling index (FFI) at a variety of aeration flow rates using both a sealed and unsealed cap. This data is presented in FIG. 13. The screen-wrapped modules were run at a flux of about 60 LMH to about 70 LMH. The unsealed cap module showed reasonable hydraulic performance as a function of permeability. The permeability values ranged from about 140 LMH/bar to 65 LMH/bar. When the unsealed cap was replaced with a sealed cap, FFI rapidly increased. It was concluded that use of an unsealed cap leads to a more stable hydraulic performance as compared to a sealed cap. When using an unsealed cap, solids-laden backwash waste from the membrane fibers may escape through the channel created by the hole in the aeration cap, whereas in the sealed cap, waste cannot escape from the module.

Figure 14:
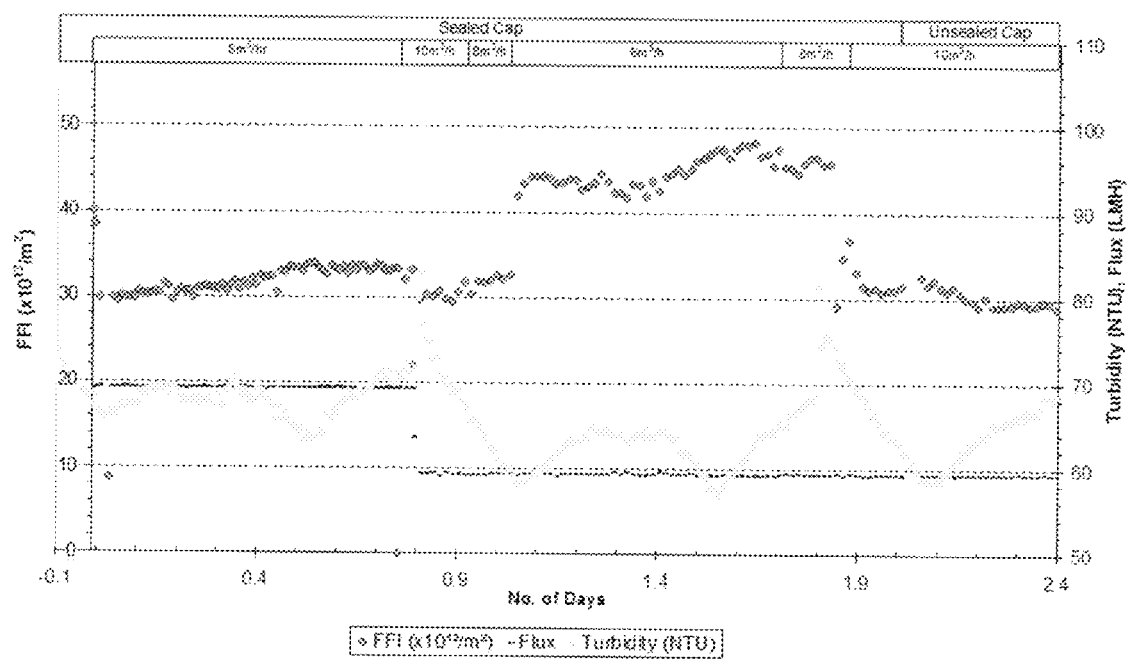

Referring to FIG. 14, it was observed that when using a sealed aeration cap, increases in backwash aeration flow rate enhanced module performance. Better flux and lower feed fouling indices were observed. When using the sealed cap, hydraulic performance increased with aeration flow rate and deteriorated with decreases in aeration flow rate. This indicated that the backwash was more efficient when the aeration flow rate was higher.

Figure 15:
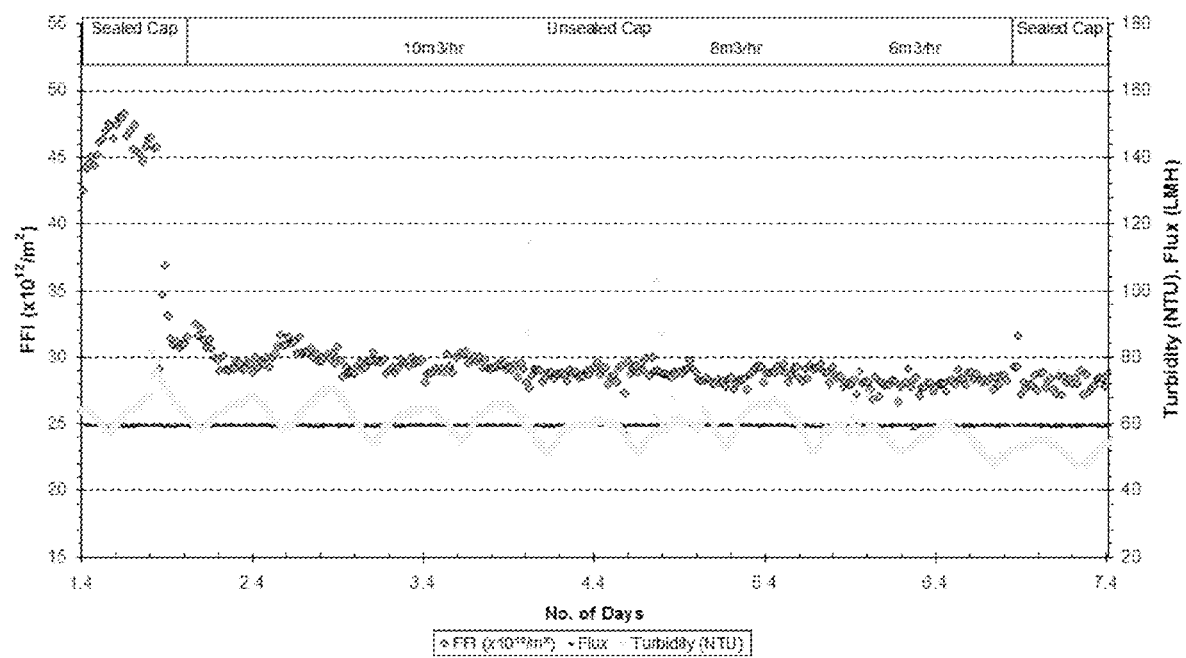

Referring now to FIG. 15, it was further observed that when the module was fitted with an unsealed aeration cap, there was little discernible change in module performance when the aeration flow rate was reduced. The aeration flow rate was lowered from 10 $m^3/h$ to 6 $m^3/h$ without any measurable deterioration in hydraulic performance. The data indicated that the backwash remained equally efficient when the aeration flow rate was reduced. Thus by using a modified aeration cap that allows for waste to escape during backwash, aeration flow rates may be reduced without deterioration in module performance. Notably, the cost of providing an aeration flow to a module comprises a significant portion of the total cost required to run the filtration system. Based on this testing, it was found that the ability to reduce the aeration flow rate without deterioration in performance when using a screen may result in a more economic operation of modules and may result in a more economic operation of filtration systems comprising wrapped modules.

Example 4

Impact of Aeration Cap Design-Unsealed Cap vs. Modified Caps

An S10 screen-wrapped module wrapped with a nylon screen having an average pore size of about 64 μm was tested to assess the impact of using an unsealed aeration cap with a three inch orifice as compared to using a modified aeration cap having two 8 mm orifices. The data collected indicated that replacing the unsealed cap with the modified cap improved hydraulic performance. The modified cap caused a higher back pressure during backwash aeration. The enhanced performance of the modified cap may be attributable, in part, to less aeration air circumventing the module though the smaller bypass orifice area. The higher back pressure during backwash aeration provided for a more effective backwash and thus more effective solids removal. In addition, the higher back pressure may have been more effective at removing solids accumulation on the outer surface of the screen. Further, the enhanced performance may also be attributable to a lower bypass flow through the modified aeration cap. It was found that the smaller bypass area reduced bypass flow and provided for less solids entering the module through the aeration cap and bypassing the screen.

Example 5

Efficacy of Maintenance Washes

A module wrapped with a 38 μm PTFE screen was used to investigate the effectiveness of regular maintenance washes on mitigating bypass flow through modified aeration cap orifices. The trial was run for 45 days and bypass flow was measured as a percentage of total flux. Feed liquid turbidity and module permeability data was also collected. Maintenance washes were performed at varied frequencies to assess their efficacy in reducing bypass flow.

At the start of the trial, the bypass flow of was 9%. The module was run for six days without undergoing a maintenance wash. On day 6, the bypass flow rate was measured and determined to have increased to 57%. Between day 6 and day 20, four maintenance washes were performed along with two shutdown periods. Maintenance washes were performed with 300 ppm of chlorine and were carried out on days 6, 9, 15 and 18. On day 20, the amount of bypass flow was 16%. This data is shown in FIG. 16.

Figure 16:
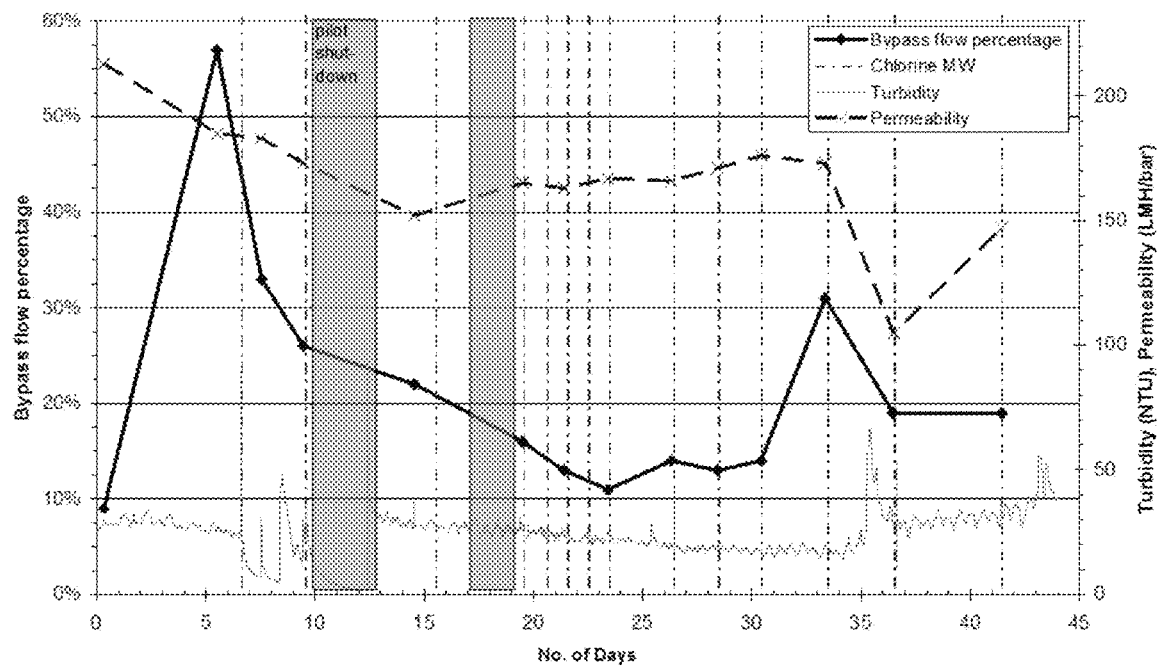
FIG. 16-19 present data discussed in accompanying Example 5 in accordance with one or more embodiments.

Still referring to FIG. 16, beginning on day 20 through day 23, maintenance washes were performed daily. The data indicated that daily maintenance washes reduced bypass flow to around 11%, and when maintenance washes were then performed every other day, bypass flow was reduced to about to around 14%. In both cases, the bypass flow percentage directly after a maintenance wash was around 10%.

Figure 17:
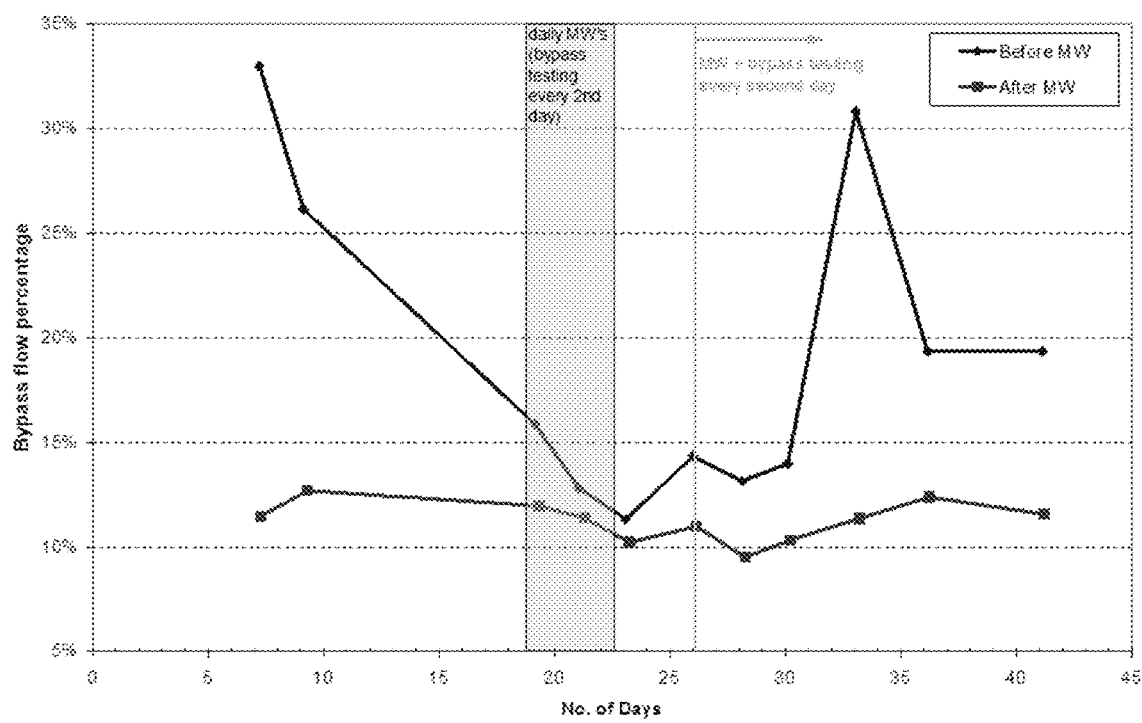

Maintenance washes were then performed on day 26 and day 30. The data from this test is shown in FIG. 17. The three day break after previous maintenance washes yielded bypass flow of around 12% directly after the wash and an average bypass flow of about 19%. A maintenance wash was then performed on day 36. The five day break after the previous maintenance wash again yielded bypass flow of around 12% directly after the wash and an average bypass flow of about 19%. A large spike in feed turbidity caused a bypass flow measure of over 30% during the three-day cleaning tests.

Figure 18:
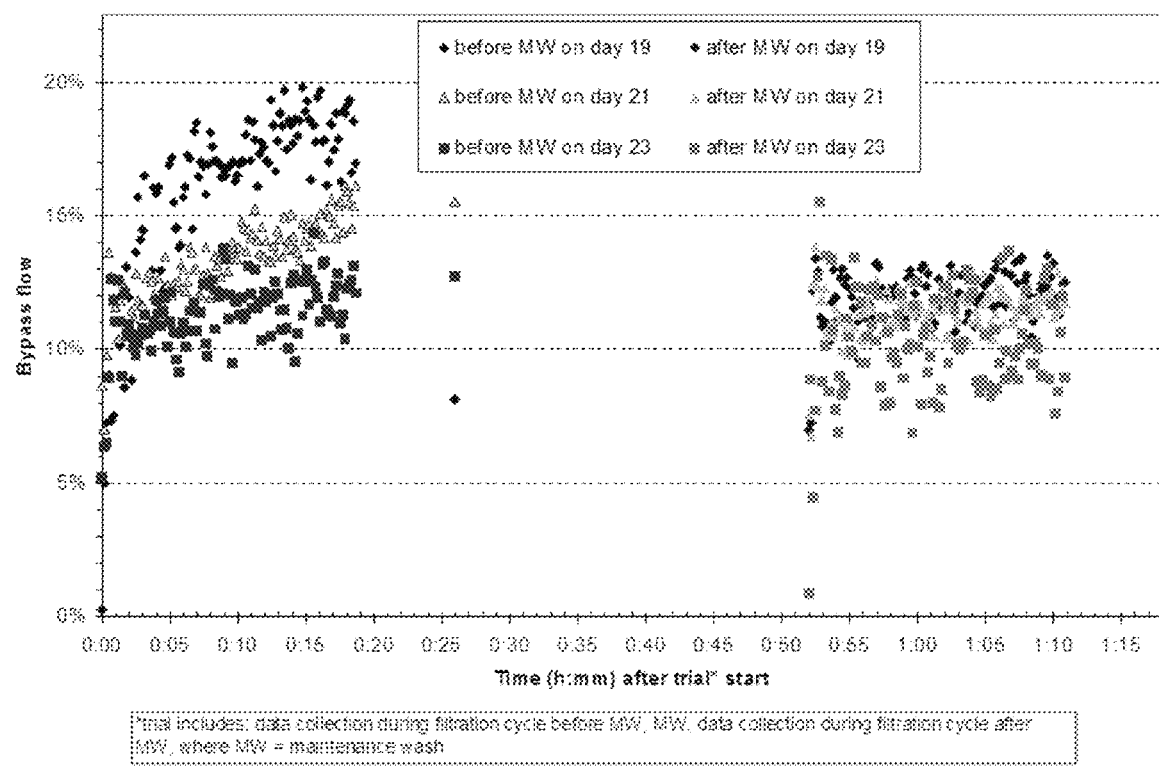
Figure 19:
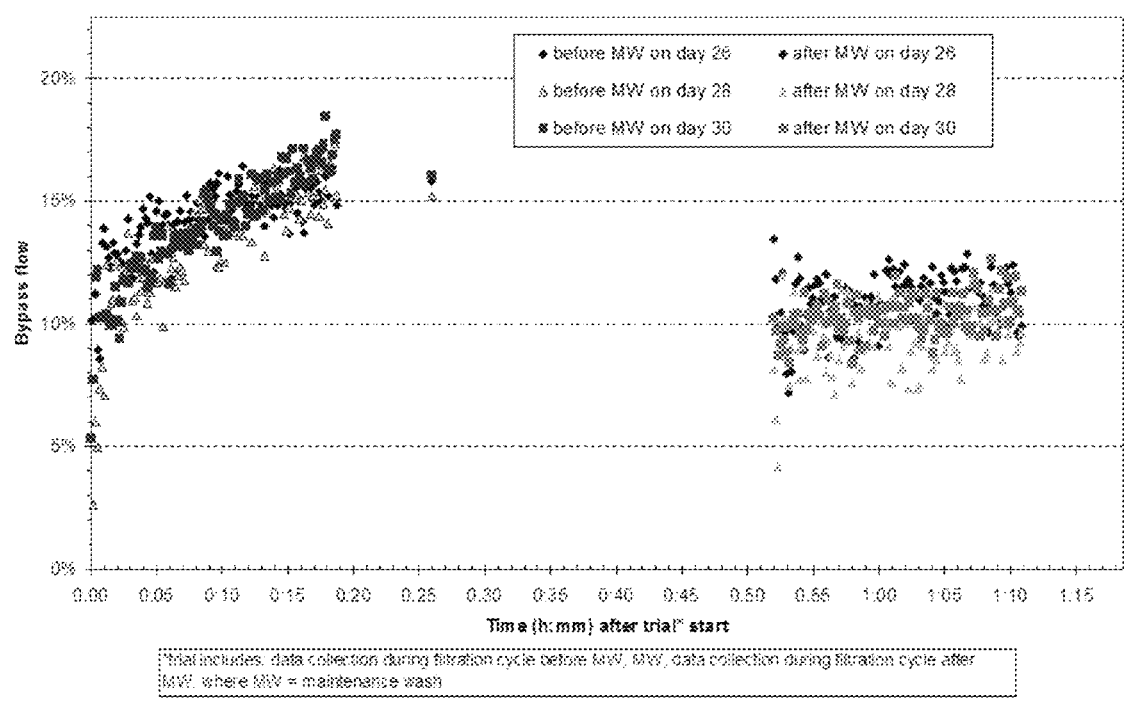

Referring to FIGS. 18 and 19, the trial indicated that daily maintenance washes were able to reduce the amount of bypass flow before a maintenance wash to approximately the level of bypass flow afterwards, which indicated that maintenance washes were able to maintain screen fouling at a permanently low level. Maintenance washes performed every second day also kept the amount of bypass flow at a constant level, though at a slightly higher constant than if washes were performed daily. However, when maintenance washes were performed every second day, the amount of bypass flow during one filtration cycle increased from around 10% to around 17%, whereas the increase observed in screens cleaned daily was less dramatic.

Example 6

Integrity of Screen-Wrapped vs. Control Modules

Figure 20:
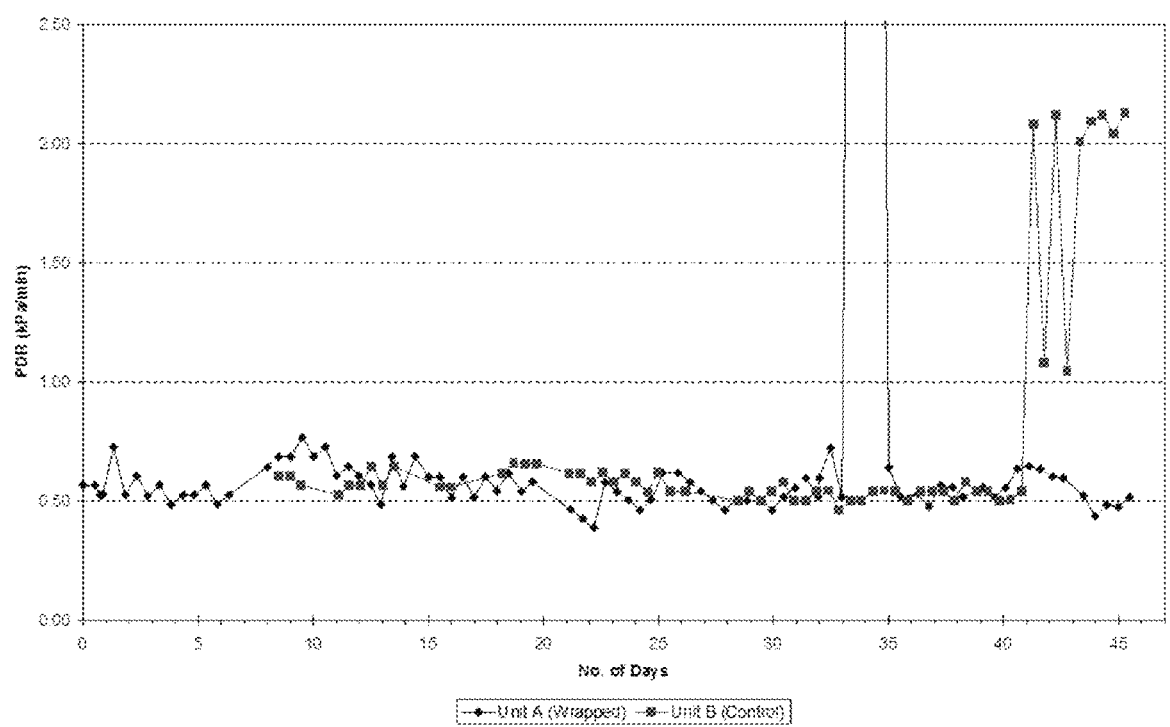
FIG. 20 presents data discussed in accompanying Example 6 in accordance with one or more embodiments.

The impact of screen-wrapping on module integrity was evaluated by wrapping a module with a nylon screen and running the wrapped module and an unwrapped control module simultaneously. Pressure decay tests were performed every 12 hours at a pressure of 100 kPa for both the control and the screen wrapped module for about 45 days. The data from this trial is presented in FIG. 20. The integrity of the wrapped module remained stable throughout the 45 day trial however the control module exhibited fiber damage in the last five days of the trial. This testing indicated that wrapping modules 4 with screen 8 may maintain the integrity of the module for a time period longer than experienced by a comparable, unwrapped module.

Through testing, it was determined that wrapping module 4 with screen 8 increased the module resistance and transmembrane pressure. Screen 8 also prevented aeration air from escaping through the screen and into the membrane tank as it normally would in an unwrapped module. The inability of aeration air to escape increased the air flow per cross-sectional module area in comparison to an unwrapped module and consequently, pressure within the screen-wrapped area between screen 8 and membranes 5 increased. The increase enabled the aeration flow rate to be reduced without reducing filtration performance.

Using aeration caps with orifices for solid-ladden backwash to escape from the module increased hydraulic performance. Using modified aeration caps with lesser sized orifices further improved module performance. It was observed that when using a modified aeration cap in place of an unsealed aeration cap, the back pressure in the system increased, which indicated that system operating costs could be reduced when using screen-wrapped modules because aeration flow rate, and thus the cost of providing aeration to the module, could while maintaining a constant transmembrane pressure.

The presence of bypass flow through modified aeration caps, however, necessarily decreased the overall efficacy of wrapping the membrane module because fiber damaging particles, meant to be rejected by the screen, could enter the module and contact the membranes. Thus it may be advantageous to install a non-return valve below modified aeration caps to prevent feed liquid from entering the module area between the screen and the membranes.

It is to be appreciated that embodiments of the systems, apparatuses and methods discussed herein are not limited in application to the details of construction and the arrangement of the apparatus components and system operations as set forth in the above description or illustrated in the accompanying drawings. The apparatuses, systems and methods are capable of implementation in other embodiments and of being practiced or of being carried out in various ways. Examples of specific implementations are provided herein for illustrative purposes only and are not intended to be limiting. In particular, systems, apparatuses and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the apparatus and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. Any references to positional or spatial orientation are intended for convenience of description, not to limit the present apparatus and methods or their components.

Having described above several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A filtration system comprising:
   A membrane module comprising:
   An upper header;
   A lower header;
   A plurality of hollow fiber membranes having upper ends potted in the upper header and lower ends potted in the lower header;
   A liquid permeable cage at least partially surrounding the plurality of hollow fiber membranes; and
   A liquid permeable screen in contact with and surrounding the cage;
   An aeration cap coupled to the lower header of the membrane module;

A non-return valve in fluid communication with the aeration cap, the non-return valve configured to provide for flow of waste out of the module and to prevent any feed liquid from entering an area between the screen and the membranes; and Wherein the membrane module includes a groove positioned at an upper end of the membrane module below the upper header, the screen being positioned below the groove and secured by a fastener, the groove and the fastener configured to prevent upward vertical movement of the screen.

2. The filtration system of claim 1, wherein the screen has an average aperture size in a range of from about 10 μm to about 500 μm.

3. The filtration system of claim 2, wherein the screen has an average aperture size in a range of from about 30 μm to about 150 μm.

4. The filtration system of claim 3, wherein the screen comprises a material capable of self-securing to at least one of the cage, the upper header, and the lower header.

5. The filtration system of claim 4, wherein the screen comprises a material selected from the group consisting of nylon, cotton, and polytetrafluoroethylene (PTFE).

6. The filtration system of claim 2, wherein the average aperture size of the screen is smaller than an average opening size of the cage.

7. The filtration system of claim 1, wherein the aeration cap comprises an area that defines an opening.

8. The filtration system of claim 7, wherein the area has a diameter in a range of from about 25 mm to about 200 mm.

9. The filtration system of claim 7, wherein the area has a plurality of openings.

10. The filtration system of claim 9, wherein the plurality of openings each have a diameter in a range of about 5 mm to about 20 mm.

11. The filtration system module of claim 1, wherein the membrane module is constructed and arranged to provide a reduction in an aeration flow rate at a constant transmembrane pressure as compared to a filtration system without a screen in contact with and surrounding the cage.

12. The filtration system of claim 1, wherein the screen extends only partially along lengths of the membranes.

13. A filtration system comprising:
a membrane module comprising:
an upper header;
a lower header;
a plurality of hollow fiber membranes having upper ends potted in the upper header and lower ends potted in the lower header;
a liquid-permeable cage at least partially surrounding the plurality of hollow fiber membranes; and
a liquid-permeable screen in contact with and surrounding the cage; and
an aeration cap coupled to the lower header of the membrane module, an opening being defined in the aeration cap; and
a selectively operable screen coupled to the aeration cap, the selectively operable screen configured to open from a closed position covering at least a portion of the opening to an open position in which the selectively operable screen remains coupled to the aeration cap to allow flow of waste out of the membrane module.

14. The filtration system of claim 13, wherein the screen is coupled to at least one of the cage, the upper header, and the lower header.

15. The filtration system of claim 14, wherein at least one of the cage, the upper header, and the lower header comprises a mating component to facilitate coupling of the screen to the cage.

16. The filtration system of claimed 13, wherein the screen is self-securing around the cage without use of securing devices.

17. The filtration system of claim 13, wherein the screen is secured to the module with a cable tie.

18. The filtration system of claim 13, wherein the screen is spaced from a periphery of the membrane module and extends a full length of the membrane module, the screen being open at an upper end thereof adjacent the upper header and defining an opening between the periphery of the membrane module and the upper end of the screen at a position along the membrane module corresponding to the upper end of the screen.

19. The filtration system of claim 13, wherein an opening is defined between a top of the screen and a bottom of the upper header.

* * * * *